(12) United States Patent
Miyamoto et al.

(10) Patent No.: US 7,530,437 B2
(45) Date of Patent: May 12, 2009

(54) TRANSMISSION AND SYNCHRONIZER

(75) Inventors: Akihiro Miyamoto, Nagoya (JP);
Masashi Yoshino, Yamato (JP)

(73) Assignee: Nissan Motor Co. Ltd., Yokohama-shi, Kanagawa (JP)

( * ) Notice: Subject to any disclaimer, the term of this patent is extended or adjusted under 35 U.S.C. 154(b) by 462 days.

(21) Appl. No.: 10/574,357

(22) PCT Filed: Oct. 27, 2005

(86) PCT No.: PCT/IB2005/003207

§ 371 (c)(1),
(2), (4) Date: Mar. 30, 2006

(87) PCT Pub. No.: WO2006/067558

PCT Pub. Date: Jun. 29, 2006

(65) Prior Publication Data
US 2008/0245169 A1    Oct. 9, 2008

(30) Foreign Application Priority Data
Oct. 28, 2004    (JP)    ............................. 2004-314705

(51) Int. Cl.
F16D 23/06    (2006.01)
(52) U.S. Cl. .................... 192/53.31; 192/53.34; 74/339
(58) Field of Classification Search .............. 192/53.31, 192/53.341
See application file for complete search history.

(56) References Cited

U.S. PATENT DOCUMENTS

| | | | |
|---|---|---|---|
| 4,573,371 A * | 3/1986 | Akutagawa | ................... 74/339 |
| 5,105,927 A * | 4/1992 | Frost | ........................ 192/53.31 |
| 5,113,986 A * | 5/1992 | Frost | ...................... 192/53.341 |
| 5,588,516 A | 12/1996 | Braun et al. | |
| 2004/0154892 A1* | 8/2004 | Coxon et al. | ............. 192/53.31 |
| 2005/0061095 A1* | 3/2005 | Yoshino et al. | ................ 74/339 |

FOREIGN PATENT DOCUMENTS

| | | |
|---|---|---|
| EP | 0656485 | 6/1995 |
| EP | 1106856 | 6/2001 |
| EP | 1517064 | 3/2005 |
| JP | 6-8824 A | 1/1994 |
| JP | 6-33952 A | 2/1994 |

* cited by examiner

Primary Examiner—Richard M. Lorence
(74) Attorney, Agent, or Firm—Young Basile

(57) ABSTRACT

A transmission synchronizer that effectively lowers the peak value of the operation load during synchronization is provided. The transmission synchronizer is equipped with a coupling sleeve, synchro hub, balk ring and clutch gear. A synchronizing support force generating mechanism, during a shift when relative rotation is generated between the synchro hub and the balk ring by a minute synchronizing torque generated between balk ring cone surface and clutch gear cone surface, converts a circumferential force induced by that relative rotation to an axially applied synchronizing support force, with which the balk ring is pressed against the clutch gear. A relative rotation regulating structure is located between the balk ring and the synchro hub, and when in neutral, it regulates the amount of relative rotation between the balk ring and the synchro hub so that the synchronizing support force is not generated.

17 Claims, 23 Drawing Sheets

TRANSMISSION AND SYNCHRONIZER

CROSS-REFERENCE TO RELATED APPLICATIONS

The present application claims priority under 35 U.S.C. §119 of Japanese Patent Application No. 2004-314705, filed on Oct. 28, 2004, the entire content of which is expressly incorporated by reference herein.

TECHNICAL FIELD OF THE INVENTION

The present invention relates to a transmission with a synchronizer that is used in automotive power transmissions, etc., and that is equipped with at least a coupling sleeve, a synchro hub, a balk ring, and a clutch gear.

BACKGROUND

In the conventional manual transmission synchronizer, the coupling sleeve is moved by the driver's shift lever operation to change speeds, and the coupling sleeve chamfer and balk ring chamfer come into contact. Then, the movement of the coupling sleeve is stopped, the cone surface of the balk ring pushes the cone surface of the clutch gear, thus generating a synchronizing torque (synchronizing force), resulting in rotation synchronization of the balk ring and the synchro hub (for example, refer to Unexamined Japanese Patent Application Publication No. H6-33952 and Unexamined Japanese Utility Model Application Publication No. H6-8824).

SUMMARY

In the conventional manual transmission synchronizer, the entire synchronizing torque (synchronizing force), which is generated when the balk ring cone surface pushes the clutch gear cone surface after the contact of the coupling sleeve chamfer and the balk ring chamfer, is directly transmitted from the coupling sleeve to the shift lever. This does not help the shift operation force to decrease.

The present invention was accomplished in light of this point, with the main purpose of providing a transmission synchronizer that can effectively lower the peak value of an operation load during synchronization.

In order to achieve the aforementioned objective, the transmission synchronizer for the present invention is equipped with a coupling sleeve, a synchro hub, a balk ring and a clutch gear. The transmission also comprises a synchronizing support force generating mechanism that, during a shift when relative rotation is generated between the synchro hub and the balk ring by a minute synchronizing torque generated between the balk ring cone surface and clutch gear cone surface, converts a circumferential force induced by the relative rotation to an axially applied synchronizing support force, with which the balk ring is pressed against the clutch gear. The transmission also comprises a relative rotation regulating structure that is located between the balk ring and the synchro hub. When in neutral, the relative rotation regulating structure regulates the relative rotation between the balk ring and the synchro hub so that the synchronizing support force is not generated.

In the transmission synchronizer for the present invention, when relative rotation is generated, during a shift, between the synchro hub and the balk ring by a minute synchronizing torque generated between the balk ring cone surface and clutch gear cone surface, a circumferential force induced by the relative rotation is converted to an axially applied synchronizing support force, with which the balk ring is pressed against the clutch gear, by the synchronizing support force generating mechanism. This synchronizing support force is generated between the synchro hub and the balk ring and its reaction force is received by the synchro hub, so it is not transmitted to the coupling sleeve side. Therefore, the force can be called a mechanical synchronizing force (hereinafter referred to as "spontaneous synchronizing force"), which is generated inside the device. Accordingly, the shift operation load necessary for the rotation synchronization is the load required to decrease the relative rotation that has already been lowered by the spontaneous synchronizing force to zero relative rotation. Thus, the peak value of the operation load during synchronization can be effectively lowered.

In addition, when in neutral, since relative rotation between the synchro hub and the balk ring is possible, when drag torque is generated in the synchro cone surface due to the weight of the balk ring, oil film, etc., relative rotation is induced between the balk ring and the synchro hub, thus attempting to generate a spontaneous push load. Because the amount of relative rotation between the balk ring and the synchro hub can be regulated when in neutral, so that a synchronizing support force is not generated by the relative rotation regulating structure installed between the balk ring and the synchro hub control, the generation of the spontaneous push load can be prevented.

DETAILED DESCRIPTION

Provided below is an explanation for the most favorable embodiment for realizing the transmission synchronizer for the present invention, with reference to Working Examples 1-4 shown in the Figures.

Figure 1:
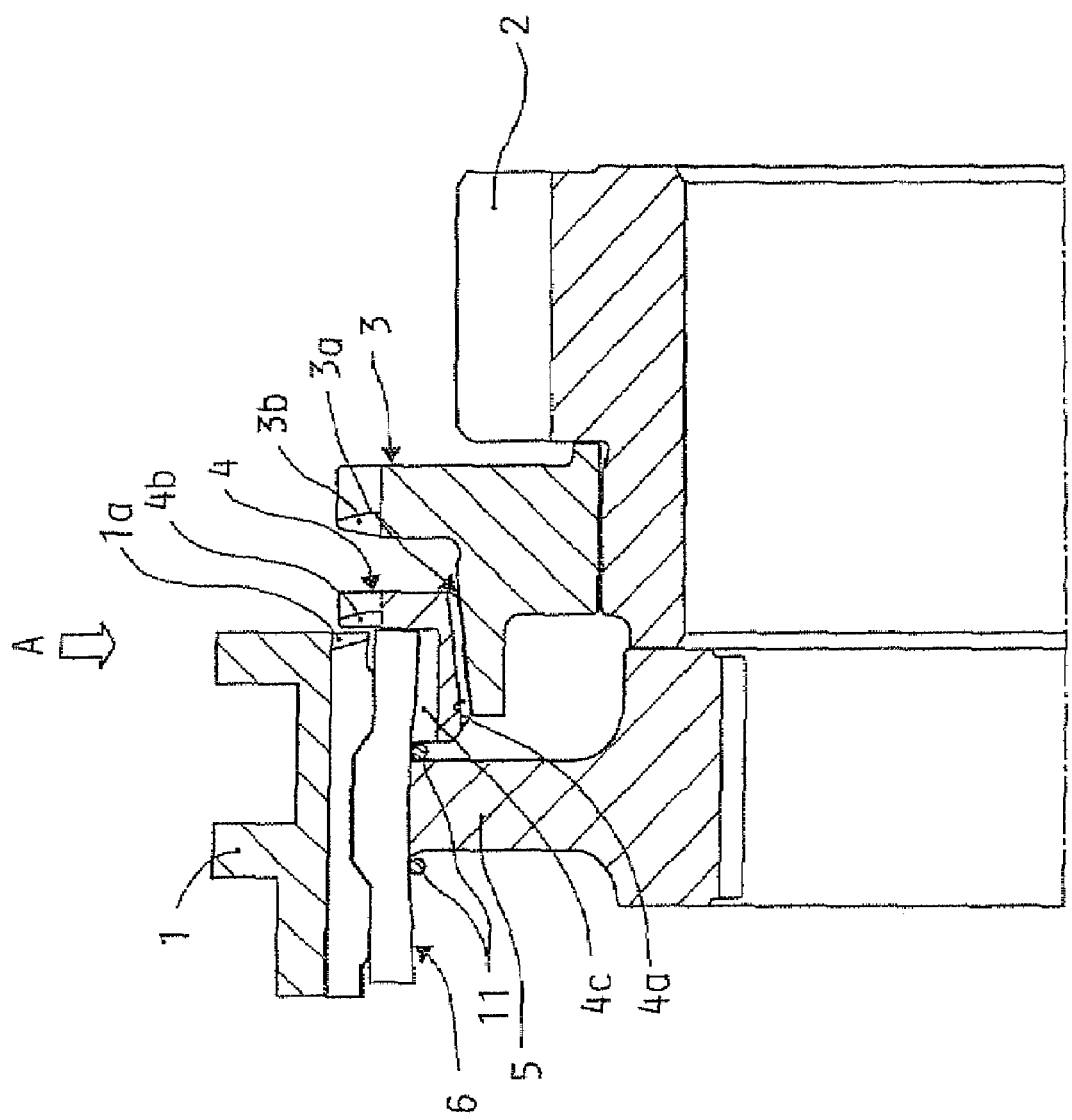
FIG. 1 is a cross-sectional view of the insert key section in the synchronizer for Working Example 1 when in neutral.

First is an explanation of the constitution. FIG. 1 is a cross-sectional view of the insert key section in the synchronizer for Working Example 1 when in neutral. As shown in FIG. 1, the transmission synchronizer for Working Example 1 is equipped with coupling sleeve 1, main gear 2, clutch gear 3, balk ring 4, synchro hub 5 and insert key 6.

Coupling sleeve 1 is an input member for the speed change operation load (manual control force or actuator driving force). Coupling sleeve 1 is connected to synchro hub 5 by means of a spline connection, rotates as a single unit with synchro hub 5, and is axially-movable. On the inner surface of coupling sleeve 1 is formed coupling chamfer 1a and fitted into the groove of the outer surface of the sleeve is a shift fork (not shown).

Main gear 2 is rotatably disposed around the transmission rotation shaft (not shown), and it rotates with the transmission rotation shaft when the shift operation is completed. The main gear is engaged with an output shaft (not shown) via other gears to be rotated with the driven tires.

Clutch gear 3 is a synchronizing member that synchronizes the rotation of main gear 2 and synchro hub 5 and is integrated with main gear 2 by means of press-fitting. On clutch gear 3 are formed clutch gear cone surface 3a, which is taper-fitted to balk ring cone surface 4a formed on balk ring 4, and clutch gear chamfer 3b, which interlocks with coupling chamfer 1a.

Balk ring 4 is a synchronizing member that synchronizes the rotation of main gear 2 and synchro hub 5, is axially-movable, and is relatively-rotatable in the circumferential direction by only a prescribed amount (positioning distance of the spline teeth chamfer, hereinafter referred to as "index distance") with respect to synchro hub 5. On this balk ring 4 are formed balk ring cone surface 4a, which is taper-fitted into clutch gear cone surface 3a, balk ring chamfers 4b, which interlock with coupling chamfers 1a, and balk ring key grooves 4c, into which insert keys 6 are positioned.

Synchro hub 5 is a synchronizing member that is affixed to the transmission rotation shaft (not shown) through a spline connection. On this synchro hub 5 are formed synchro hub splines 5a, which fit into coupling chamfers 1a of coupling sleeve 1, and insert key grooves 5c, into which insert keys 6 are positioned.

Insert keys 6 are synchronizing members that are positioned at three insert key grooves 5c (refer to FIG. 4) formed on the outer circumference of synchro hub 5. Insert keys 6 are supported by synchro hub 5, coupling sleeve 1 and key springs 11. The positioning of insert keys 6 is achieved by locking the key projections on the outer circumference of insert keys 6 into the key grooves of coupling sleeve 1 so that they integrally rotate with synchro hub 5, and are axially-movable by engaging with coupling sleeve 1.

Figure 2:
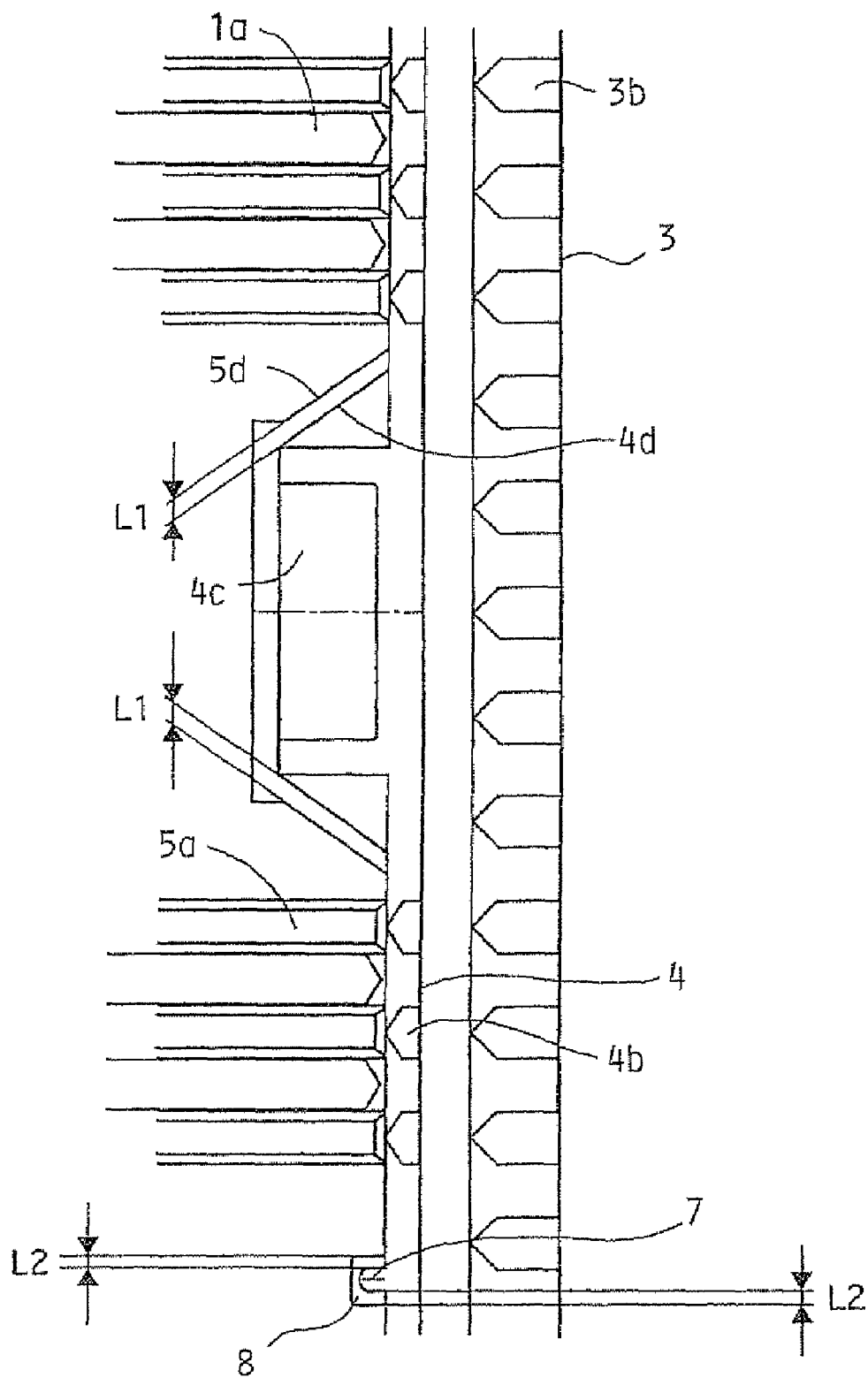
FIG. 2 is a partial plan view of the synchronizer for Working Example 1 seen from the direction of arrow A shown in FIG. 1.
Figure 3:
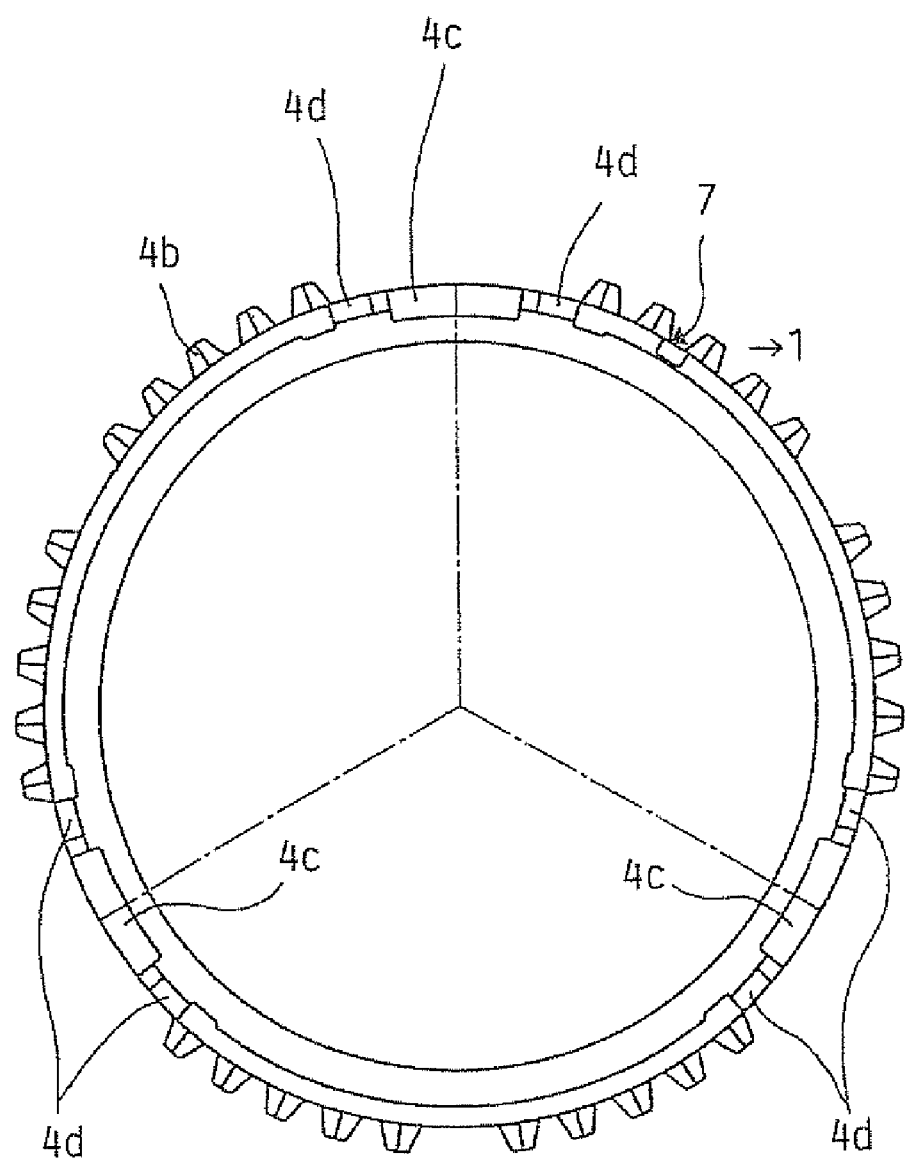
FIG. 3 is a front view of the balk ring in the synchronizer for Working Example 1.
Figure 4:
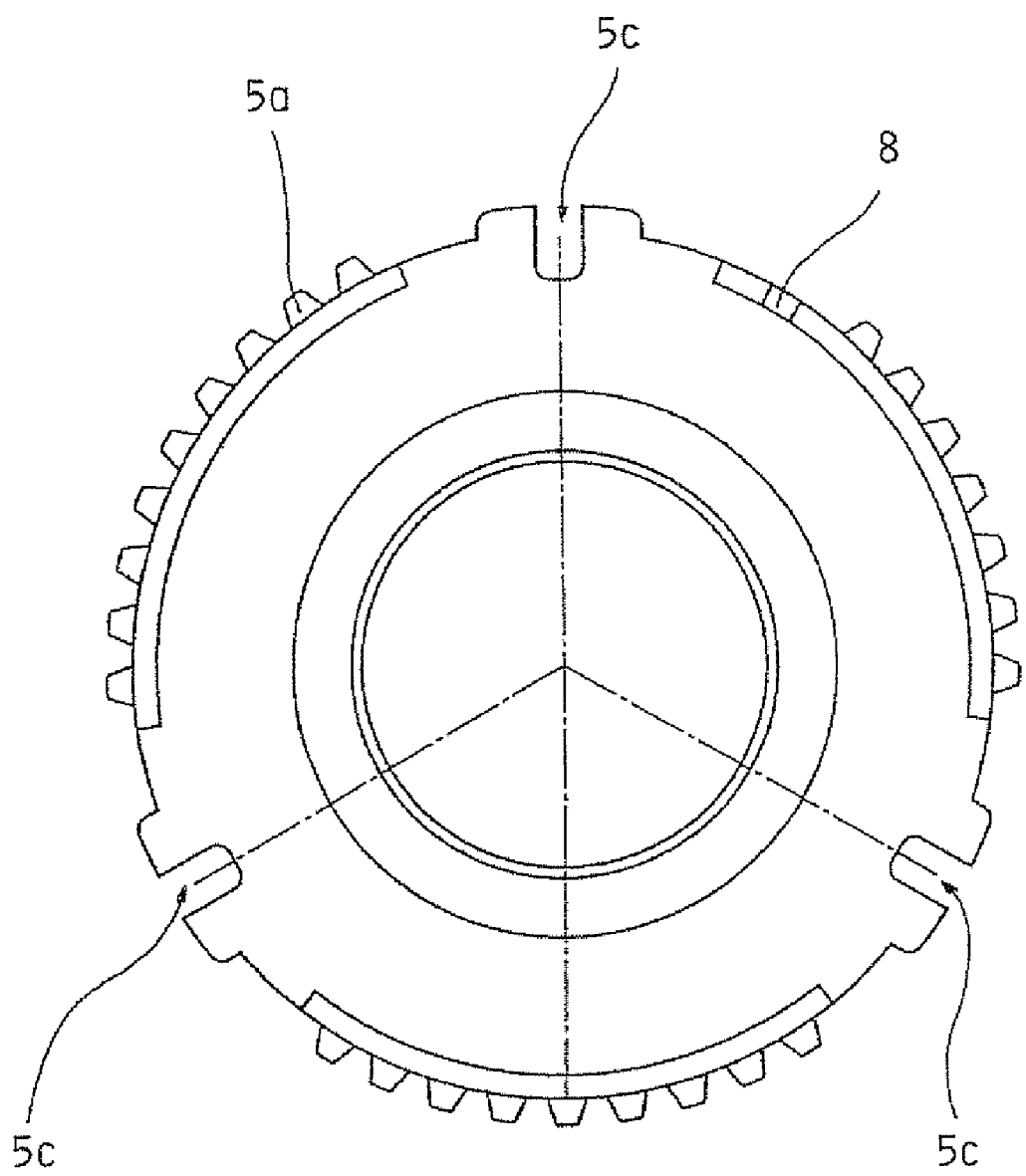
FIG. 4 is a front view of the synchro hub in the synchronizer for Working Example 1.

FIG. 2 is a partial plan view of the synchronizer for Working Example 1 seen from the direction of arrow A in FIG. 1. FIG. 3 is a front view of the balk ring for the synchronizer in Working Example 1. FIG. 4 is a front view of the synchro hub for the synchronizer in Working Example 1. Below is provided an explanation of the configurations for the synchronizing support force generating mechanism and the relative rotation regulating structure.

Synchronizing support force generating mechanism is a mechanism that, during a shift when relative rotation is generated between synchro hub 5 and balk ring 4 by a minute synchronizing torque generated between balk ring cone surface 4a and clutch gear cone surface 3a, converts the circumferential force induced by the relative rotation to an axially-applied synchronizing support force, in which balk ring 4 is pressed against clutch gear 3.

As shown in FIG. 2, the synchronizing support force generating mechanism in Working Example 1 is installed in a position that faces synchro hub 5 and balk ring 4 along the axial direction and consists of synchro hub concave portion 5d and balk ring convex portion 4d that generate a synchronizing support force, through the cam surface contact, by indexed relative rotation between synchro hub 5 and balk ring 4

As shown in FIG. 2, synchro hub concave portion 5d is concave with a pair of inclined surfaces formed on both sides of insert key groove 5c of synchro hub 5. Referring to FIG. 4, synchro hub concave portions 5d are at three positions on the circumference.

As shown in FIG. 2, balk ring convex portion 4d is convex with a pair of inclined surfaces formed on both sides of balk ring key grooves 4c. As shown in FIG. 3, balk ring convex portions 4d are at three positions on the circumference. The inclination angle of each cam surface is determined so that a suitable synchronizing support force is obtained. In Working Example 1, the inclined surface has a constant inclination angle of approximately 45°, which is effective in generating a synchronizing support force.

The relative rotation regulating structure is located between balk ring 4 and synchro hub 5, and when in neutral, the relative rotation regulating structure regulates the relative rotation between balk ring 4 and synchro hub 5 so that the synchronizing support force is not generated.

The relative rotation regulating structure in Working Example 1 is installed in a position that faces synchro hub 5 and balk ring 4 along the axial direction and consists of relative rotation positioning concave portion 8 and relative rotation positioning convex portion 7. These portions 7,8 regulate the relative rotation between synchro hub 5 and balk ring 4 by means of concave-convex contact.

As shown in FIG. 2, for relative rotation positioning concave portion 8, if the circumferential gap between the inclined surface of synchro hub concave 5d and the inclined surface of balk ring convex 4d is L1, and the circumferential gap between relative rotation positioning concave portion 8 and relative rotation positioning convex portion 7 is L2, then L1 is set to be larger than L2.

Relative rotation positioning concave portion 8 engages with relative rotation positioning convex portion 7 when in neutral, and the engagement is released during the synchronizing operation. Therefore, they are configured so that L3 is larger than L4 if the axial distance of relative rotation positioning convex portion 7 is L4, and the axial moving distance of balk ring 4 for synchronization is L3 (refer to FIG. 11).

As shown in FIG. 2, relative rotation positioning concave portion 8 is a rectangular groove, and relative rotation positioning convex portion 7 is one rectangular projection, the top of which is rounded. As shown in FIGS. 3 and 4, relative rotation positioning convex portion 7 and relative rotation positioning concave portion 8 are installed at one position or more on the circumference.

Figure 5A:
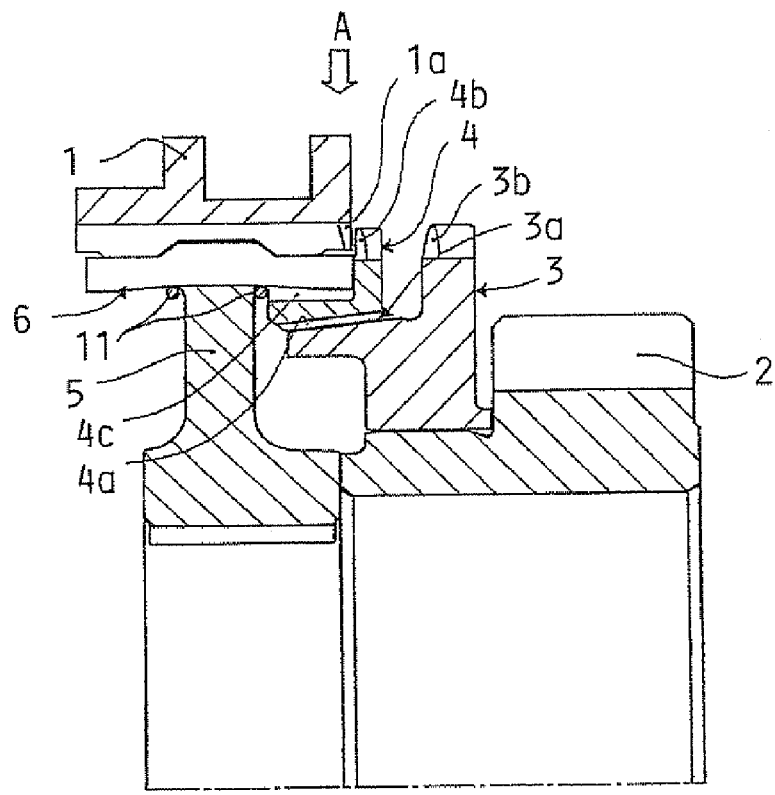
FIG. 5A is a cross-sectional view of the insert key section in the synchronizer when in neutral, as an example of the prior art.
Figure 5B:
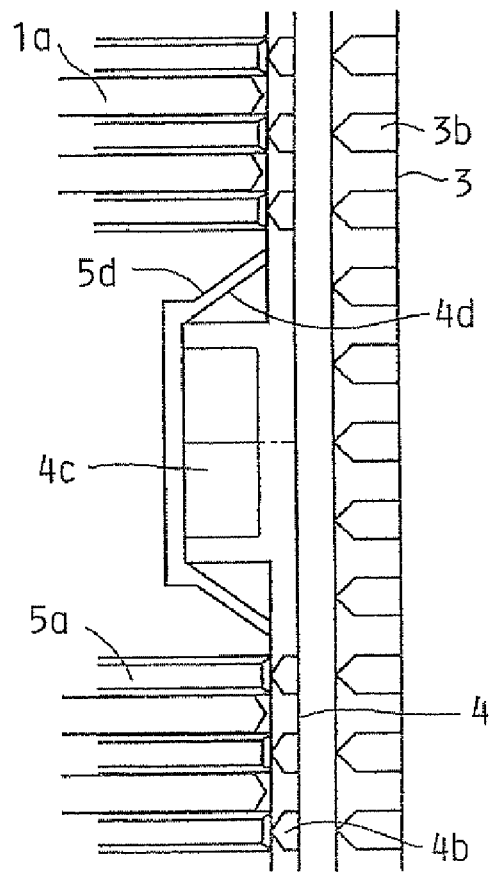
FIG. 5B is a partial plan view from the direction of arrow A.

As shown in FIGS. 5A and 5B, the present applicant proposed a transmission synchronizer in Japanese Patent Application No. 2004-135994 that is equipped with coupling sleeve 1, synchro hub 5, balk ring 4 and clutch gear 3. The transmission synchronizer also comprises a synchronizing support force generating mechanism (synchro hub concave portion 5d and balk ring convex portion 4d) that, during a shift when relative rotation is generated between synchro hub 5 and balk ring 4 by a minute synchronizing torque generated between balk ring cone surface 4a and clutch gear cone surface 3a, converts the circumferential force induced by the relative rotation to an axially-applied synchronizing support force, in which balk ring 4 is pressed against clutch gear 3.

In the aforementioned prior invention, during a shift, the circumferential force induced by the relative rotation between synchro hub 5 and balk ring 4 is converted to an axially-applied synchronizing support force in which balk ring 4 is pressed against clutch gear 3. This synchronizing support force is generated between synchro hub 5 and balk ring 4, and the reaction force is received by synchro hub 5, so it is not transmitted to the side on which coupling sleeve 1 is located. Therefore, the force can be called a spontaneous synchronizing force. Accordingly, the shift operation load necessary for the rotation synchronization is the load required to decrease the relative rotation that has already been lowered by the spontaneous synchronizing force to zero relative rotation. Thus, the peak value of the operation load during synchronization can be effectively lowered.

Figure 6A:
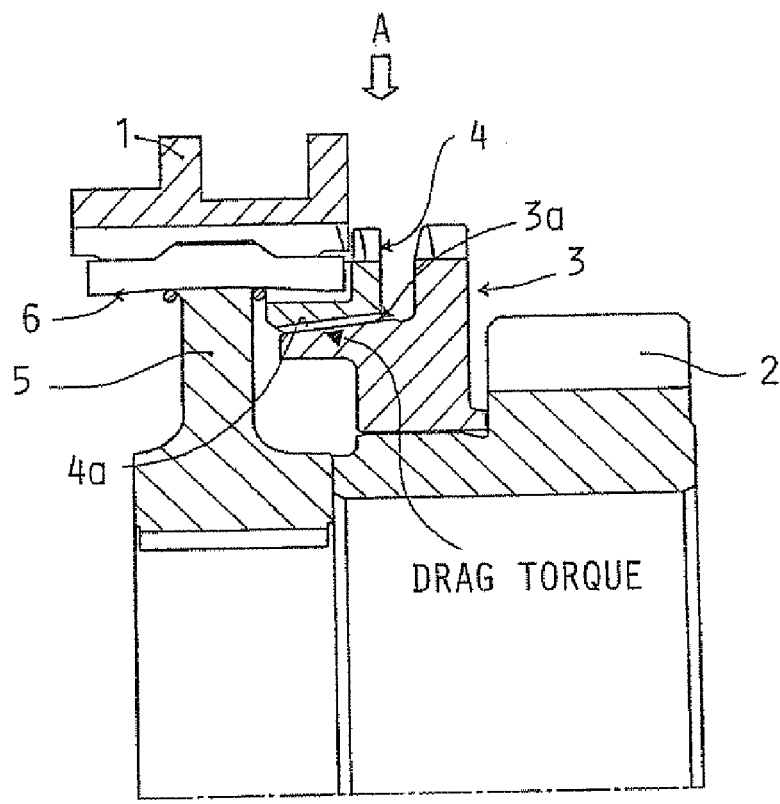
FIG. 6A is a cross-sectional view of the insert key section in the synchronizer during shifting as an example of the prior art.
Figure 6B:
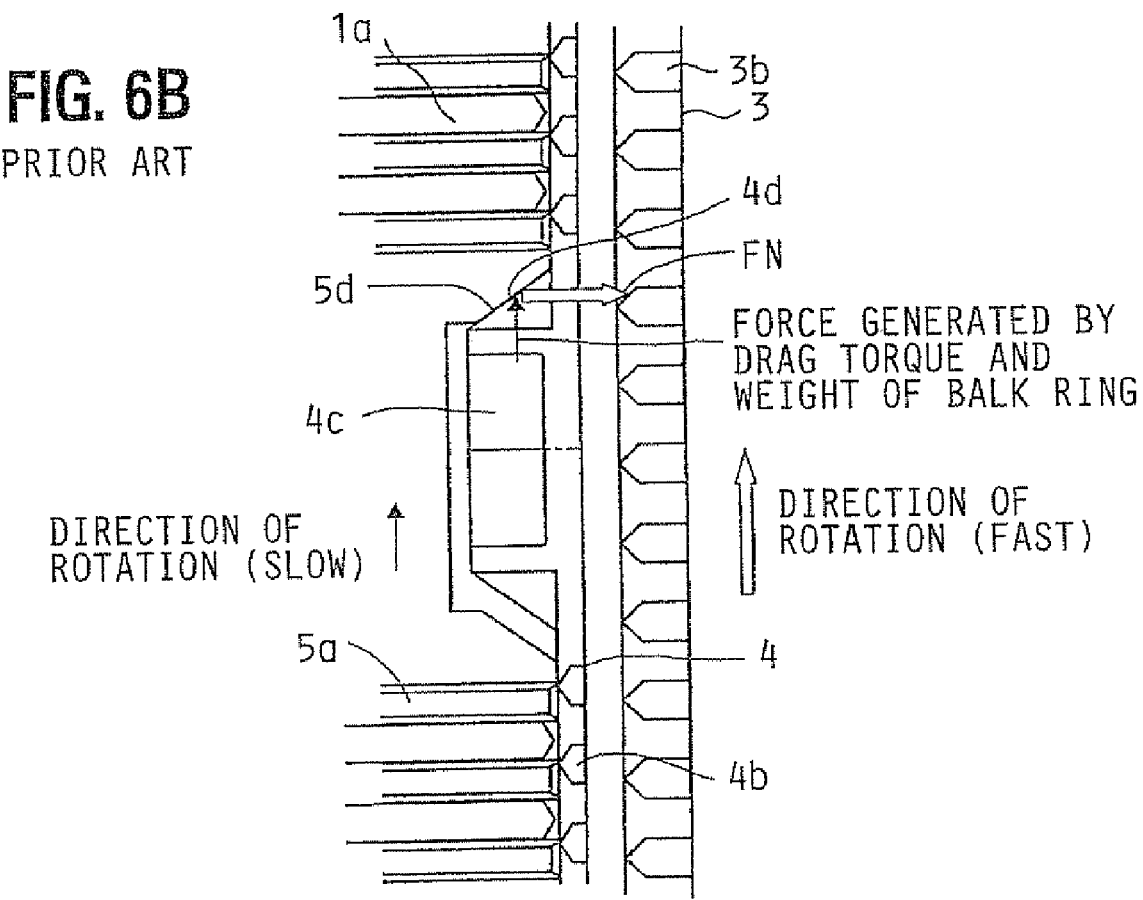
FIG. 6B is a partial plan view from the direction of arrow A.
Figure 7A:
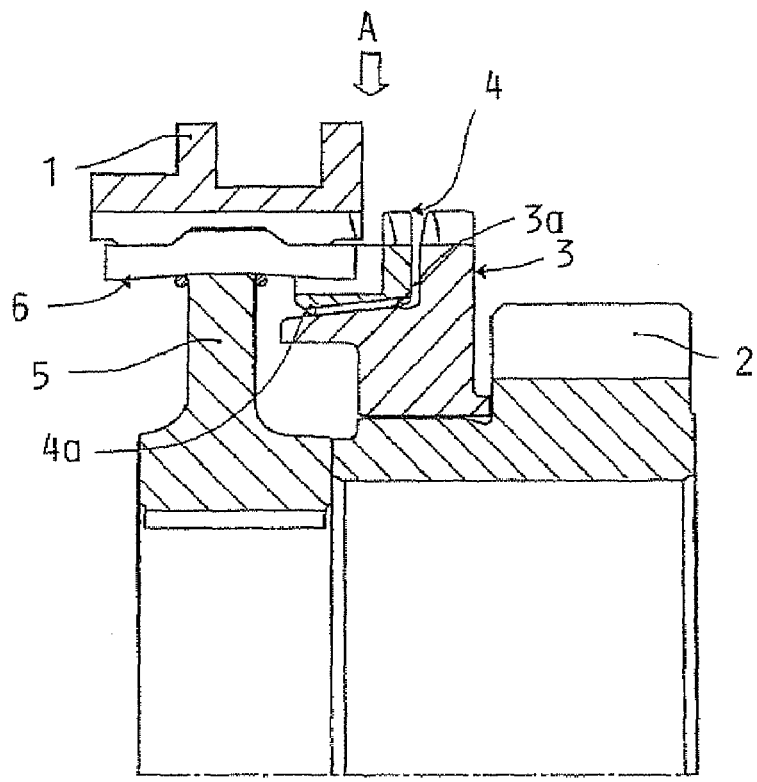
FIG. 7A is a cross-sectional view of the insert key section in the synchronizer during the pushing-through state as an example of the prior art.
Figure 7B:
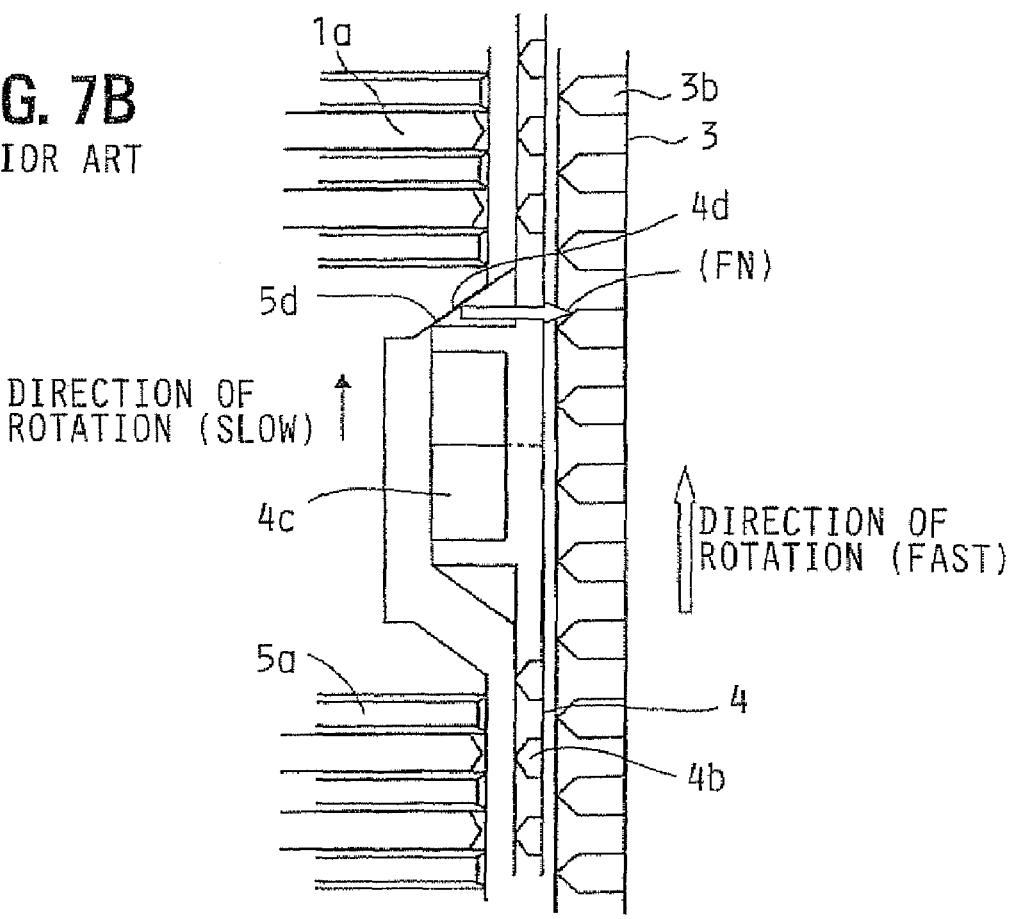
FIG. 7B is a partial plan view from the direction of arrow A.

However, when in neutral, as shown in FIGS. 5A and 5B, drag torque is generated between balk ring cone surface 4a and clutch gear cone surface 3a due to the weight of balk ring 4 or oil film, etc., causing relative rotation between balk ring 4 and synchro hub 5 due to this drag torque, and as a result, synchro hub concave portion 5d comes into contact with balk ring convex portion 4d, and a spontaneous push load is generated that pushes balk ring 4 against clutch gear cone surface 3a, (refer to FIGS. 6A and 6B). If a spontaneous push load is generated when driving in other positions, balk ring 4 stays pushed against the side of clutch gear 3. Since a constant push load is generated in relation to balk ring 4, balk ring cone surface 4a and clutch gear cone surface 3a are brought into frictional contact (refer to FIGS. 7A and 7B).

In other words, when in neutral (no selection of gears), synchro hub concave portion 5d and balk ring convex portion 4d come into contact with each other due to the drag torque that is generated between balk ring cone surface 4a clutch gear cone surface 3a, so a spontaneous push load that pushes clutch gear cone surface 3a to balk ring 4 is constantly generated.

The shift synchronizing operation of the synchronizer for Working Example 1 for solving the aforementioned problems is explained below. Here, coupling sleeve 1 is moved to the right direction shown in FIG. 1. The rotation of main gear 2, which is rotating at a high speed, is synchronized to the rotation of the rotating transmission shaft, which is rotating at a low speed, and main gear 2 is integrally-rotated with the transmission shaft.

When in neutral, there is a relative rotation difference between synchro hub 5 and clutch gear 3, and balk ring 4 rotates with synchro hub 5 (refer to FIGS. 1 and 2).

When drag torque is generated between balk ring cone surface 4a and clutch gear cone surface 3a, due to the weight of balk ring 4 or oil film, etc., relative rotation is induced between balk ring 4 and synchro hub 5 because of this drag torque, and synchro hub concave portion 5d and the balk ring convex portion 4d move in the circumferential direction in an attempt to make contact.

Figure 8:
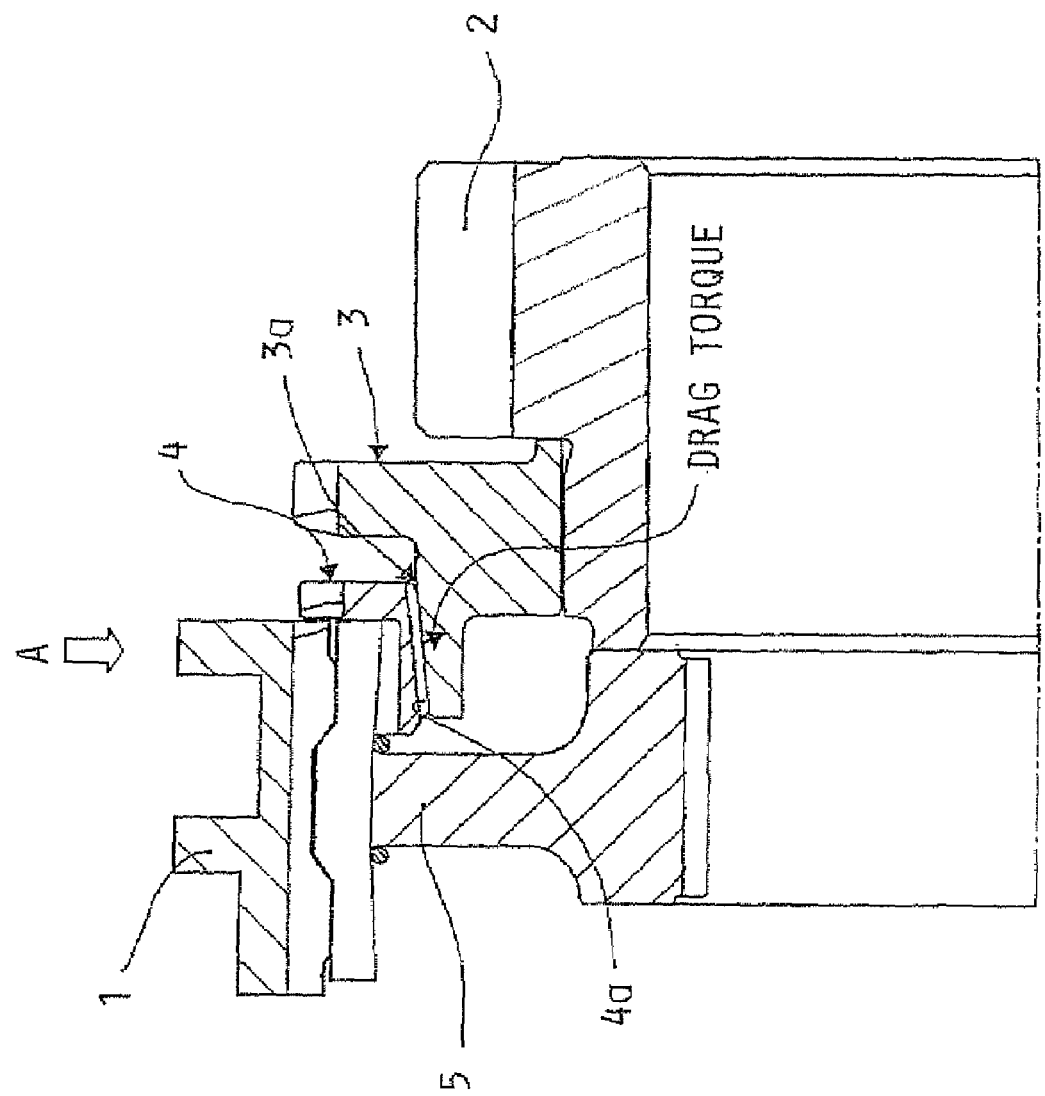
FIG. 8 is a cross-sectional view of the insert key section when the relative rotation positioning portion is in the locked state in the synchronizer for Working Example 1.
Figure 9:
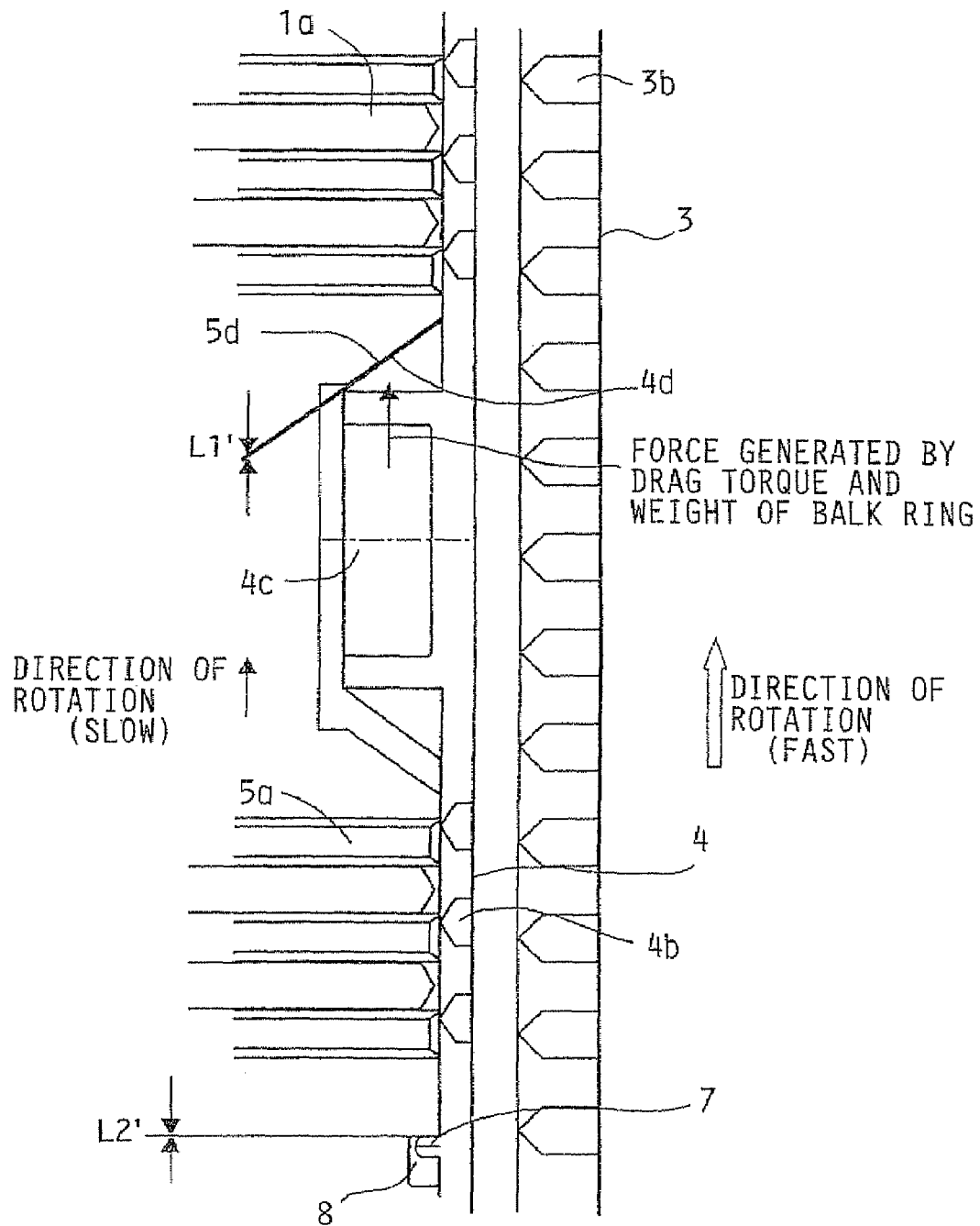
FIG. 9 is a partial plan view of the synchronizer in Working Example 1 seen from the direction of arrow A shown in FIG. 8.

However, before the inclined surface of balk ring convex portion 4d and the inclined surface of synchro hub concave portion 5d abut, the circumferential gap L2 between relative rotation positioning convex portion 7 and relative rotation positioning concave portion 8 disappears, and L2'=0 (see FIG. 9). Accordingly, relative rotation positioning convex portion 7 and concave portion 8 lock with one another and the circumferential gap between balk ring convex portion 4d and synchro hub concave portion 5d, or L1, is maintained as a gap in which L1'>0. In other words, when in neutral, the occurrence of spontaneous push load FN due to the contact between bulk ring convex portion 4d and synchro hub concave portion 5d, can be prevented (compare FIGS. 6A and 6B to FIGS. 8 and 9). More exactly, when in neutral, even if drag torque is generated between bulk ring cone surface 4a and clutch gear cone surface 3a due to the weight of bulk ring 4 or oil film etc., the occurrence of a spontaneous synchronizing force can be prevented.

Figure 10:
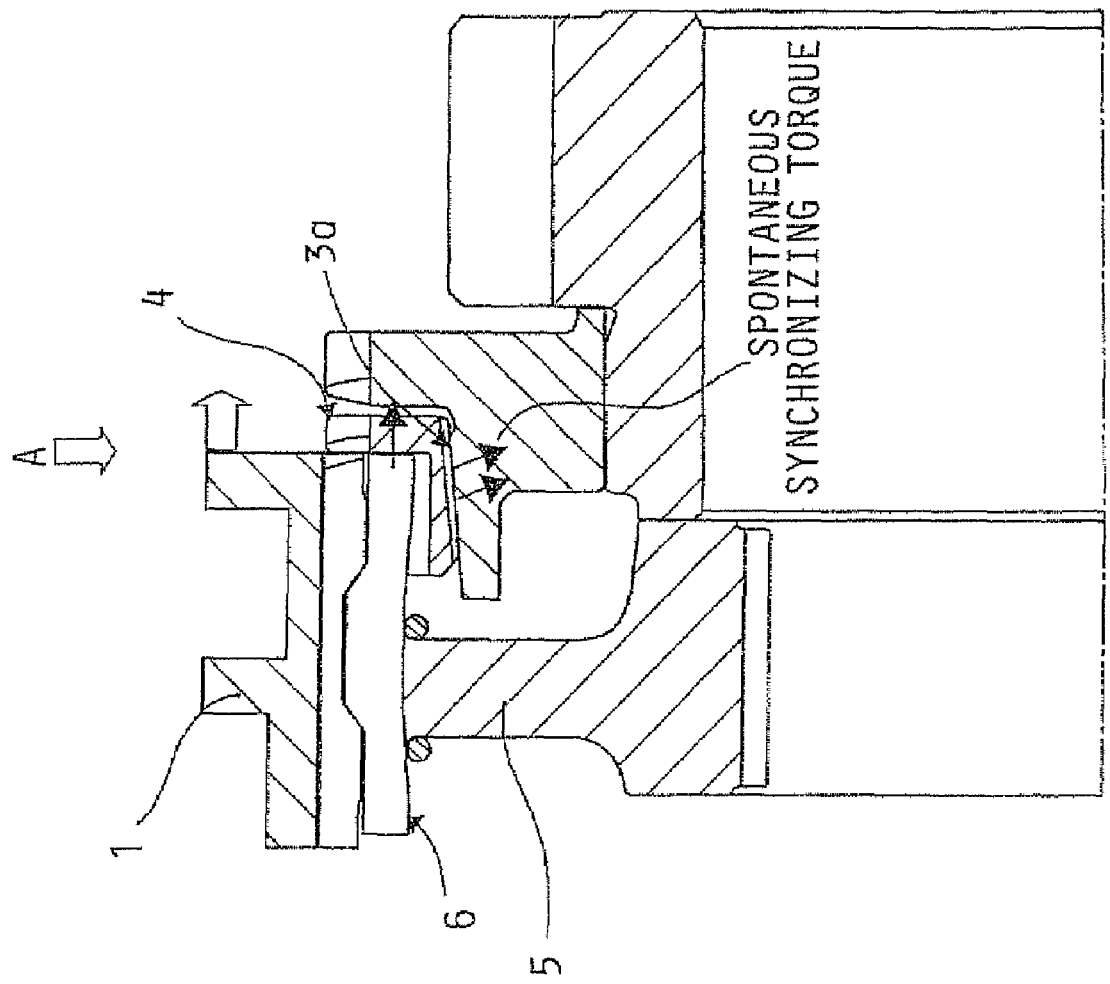
FIG. 10 is a cross-sectional view of the insert key section in the synchronizer for Working Example 1 during synchronization.
Figure 11:
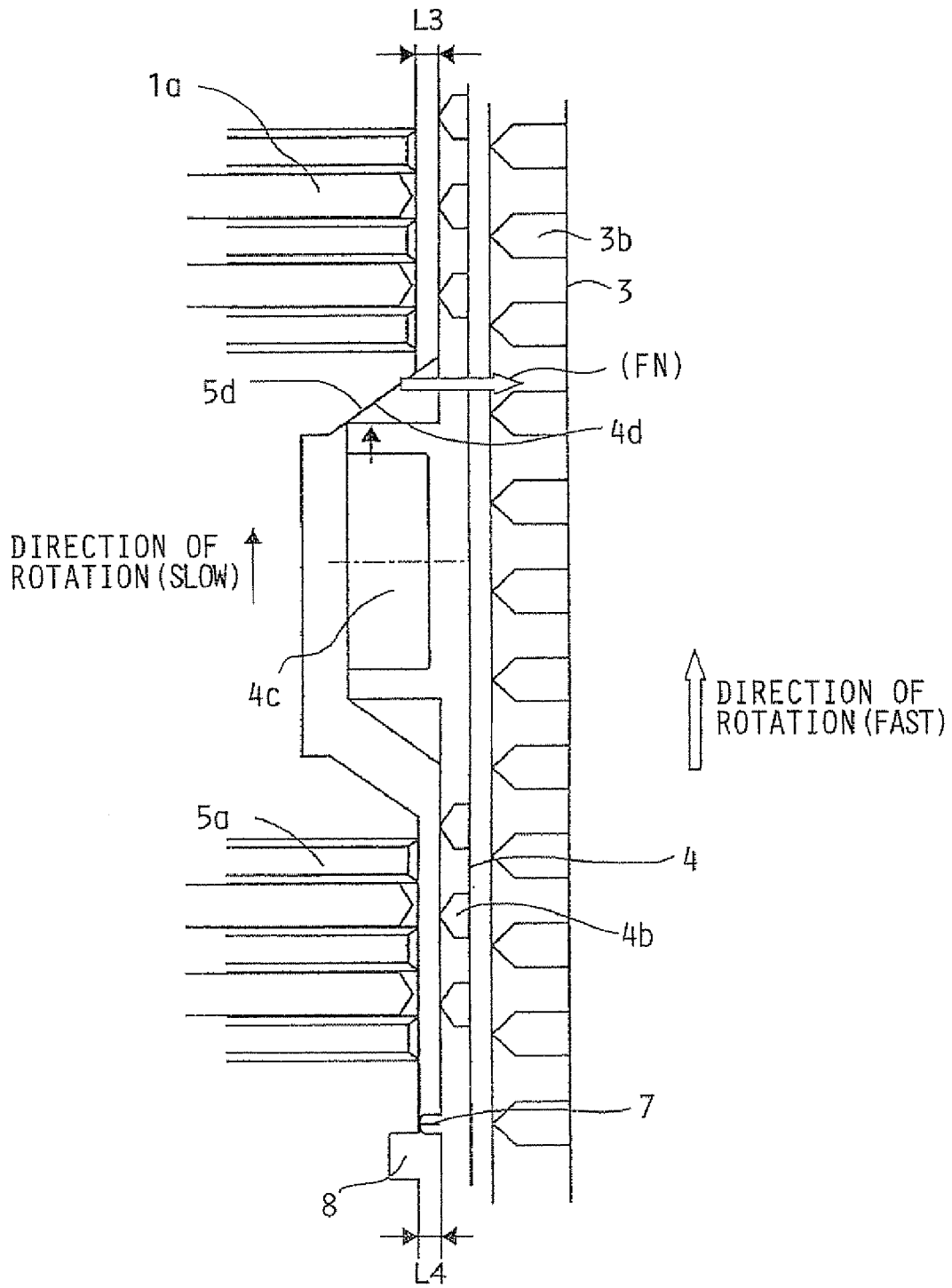
FIG. 11 is a partial plan view of the synchronizer for Working Example 1 seen from the direction of arrow A shown in FIG. 10.

When coupling sleeve 1 is moved from the neutral position to the shift direction, insert keys 6 push balk ring 4 and balk ring cone surface 4a and clutch gear cone surface 3a come into contact with one another, but since the distance of the movement of balk ring 4, or L3, is shorter than the axial distance of relative rotation positioning convex portion 7, or L4, the concave-convex fitting of relative rotation positioning convex portion 7 and concave portion 8 is released so the synchronizing operation becomes possible (refer to FIGS. 10 and 11).

When insert keys 6 push balk ring 4, balk ring cone surface 4a and clutch gear cone surface 3a come into contact with one another, generating a minute synchronizing torque and performing indexing of balk ring 4. The indexing is performed (by sliding) along the inclined surfaces of the cam of balk ring convex portion 4d and synchro hub concave portion 5d. Therefore, a spontaneous synchronizing force is generated by balk ring convex portion 4d and synchro hub concave portion 5d at the time that the indexing is performed, and balk ring 4 does not use the input from coupling sleeve 1. The synchronizing operation starts spontaneously.

Then, after indexing of balk ring 4 is completed, coupling sleeve 1 moves even further, coupling chamfer 1a pushes balk ring chamfer 4b. Spontaneous synchronizing torque and synchronizing torque generated by the pushing force of coupling chamfer 1a on balk ring chamfer 4b cause the synchronizing operation to take place. When synchronization is completed, coupling chamfer 1a pushes through balk ring chamfer 4b.

Namely, coupling chamfer 1a pushes through balk ring chamfer 4b and strokes it, and when coupling chamfer 1a moves as far as the position between itself and where it comes into contact with balk ring chamfer 4b, coupling chamfer 1a finishes pushing through balk ring chamfer 4b.

Next, coupling chamfer 1a strokes and interlocks with clutch gear chamfer 3b so that synchro hub 5 and clutch gear 3 are integrated by means of a spline connection via coupling sleeve 1 and shifting is completed. At the "shifting completed" state, at the point at which the synchronization that took place before shifting was completed is finished, balk ring 4 returns to the neutral position (initial position) due to the force of a return spring (not shown in the Figure). As a result, relative rotation positioning convex portion 7 and concave portion 8 also return to the initial position in accordance with the return of balk ring 4 to its initial position.

Therefore, for the synchronizer in Working Example 1, according to the relative rotation regulating structure, in order to regulate the amount of relative rotation of balk ring 4 and synchro hub 5 when in neutral so that a synchronizing support force is not generated, a smooth shift operation can always be ensured, whether or not drag torque occurs on the synchro cone surface. This is because when changing gears, regardless of whether or not drag torque occurs when in neutral, the operation load characteristics shown in FIG. 12, which suppress the peak value of the operation load and the synchronizing task volume, can be reliably achieved.

In addition, when in neutral, as shown in FIG. 2, since the size relationship between circumferential gap L1 between synchro hub concave portion 5d and balk ring convex portion 4d and circumferential gap L2 between relative rotation positioning convex portion 7 and concave portion 8 is set so that L1>L2, contact between the inclined surface of balk ring convex portion 4d and synchro hub concave portion 5d, which is generated by the synchronizing support force, can be reliably prevented. Furthermore, as shown in FIG. 11, since the size relationship between axial length L4 of relative rotation positioning convex portion 7 and the amount of movement L3 in which balk ring 4 moves in the axial direction in order to perform the synchronizing operation is set so that L3>L4, then interlocking of relative rotation positioning convex portion 7 and concave portion 8 when in neutral, as well as the release of the interlocked state of relative rotation positioning convex portion 7 and concave portion 8 during the synchronization operation, can be reliably achieved.

Figure 12:
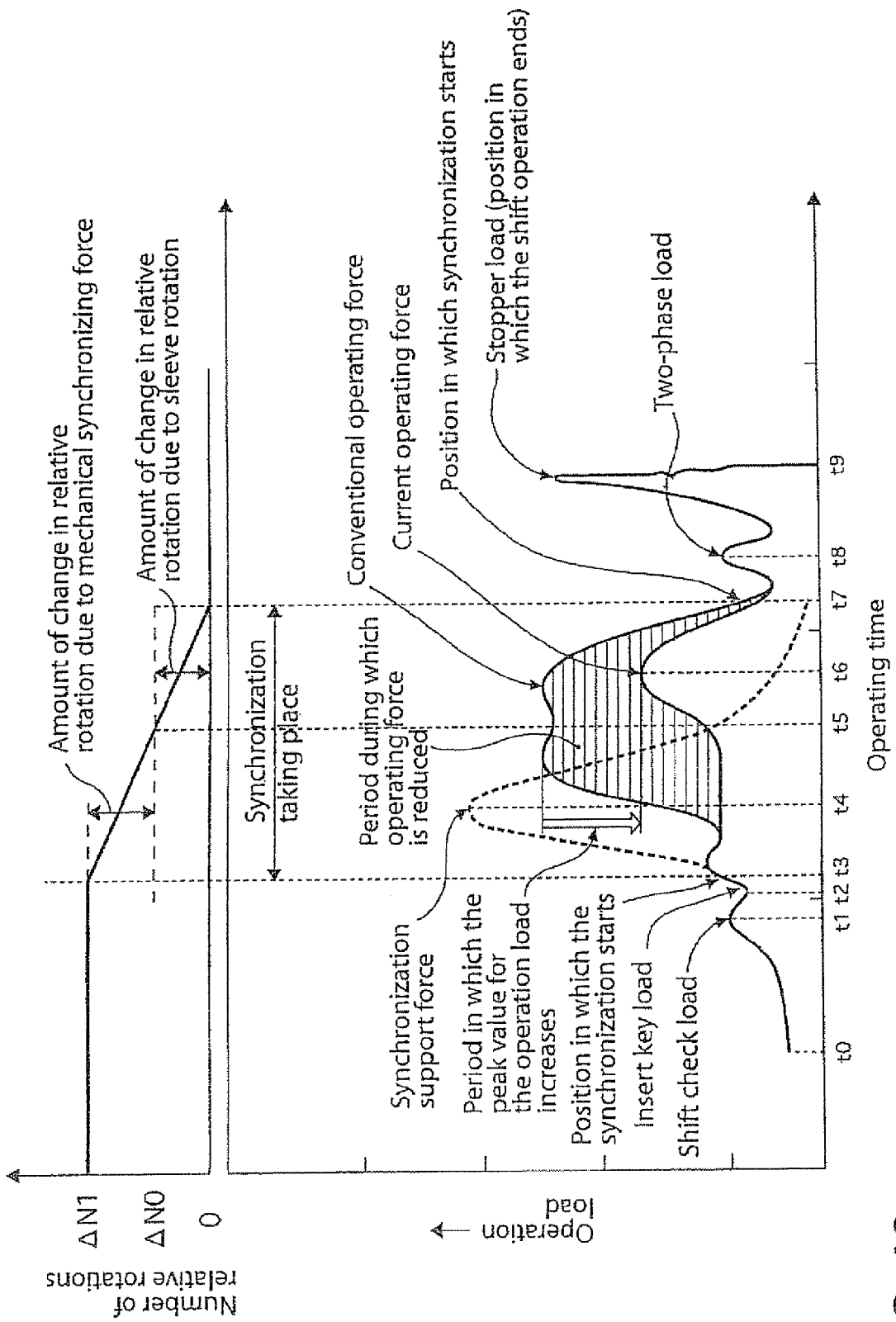
FIG. 12 is a comparison diagram showing a comparison of the relative rotation characteristics and operation load characteristics with respect to the operation time in the synchronizer for Working Example 1 as compared to the conventional device.

Next is provided an explanation of the operation load characteristics shown in FIG. 12. First, the shift operation of the shift lever is started at point t0. Then coupling sleeve 1 and insert keys 6 move from neutral, shown in FIG. 1, to the right direction, and the operation load gradually increases until it reaches point t1, where a shift check ball provided in a centrally-located position of the shift operating mechanism, to which the load from the shift lever is transmitted, rises up against the spring biasing force. When the shift check ball it rises at point t1, the maximum shift check load operates and after this and until point t2, the operation load decreases. In the case of an automatic MT, at point t0, the shift operation is started and the operation load increases gradually until point t2. The operation explained below is the same for both a manual transmission and an automatic MT.

Next, insert keys 6 close up the clearance between themselves and the surface of the groove wall of balk ring 4 to begin making contact, and the insert key load increases. When balk ring 4 moves to the right due to the increase in the insert key load, clutch gear cone surface 3a and bulk ring cone surface 4a come into contact with one another, as shown in FIGS. 8 and 9, generating a minute synchronizing torque. Synchronizing caused by the synchronizing support force begins at point t3.

When the synchronization caused by the support force begins, relative rotation occurs between synchro hub 5 and balk ring 4 due to the synchronizing torque that occurs between the two cone surfaces 3a and 4a, and indexing of balk ring 4 is performed. As shown by the balk ring indexing in FIG. 11, balk ring convex portion 4d of balk ring 4 and synchro hub concave portion 5d of synchro hub 5 come into contact with one another. The circumferential relative rotation force that is generated when convex/concave portions 4d, 5d come into contact with one another is divided into an axial direction force and a circumferential direction force because the cam surface has an inclined angle. Of these two forces, the axial direction force serves as the synchronizing support force that operates to push balk ring 4 to the side on which main gear 2 is located.

As shown in FIG. 12, the synchronizing support force shows an increase and decrease in characteristics between t3 to t4 (the beginning of the synchronization) and t4 (maximum amount) to t5 (the switching point), and synchronizing torque is generated between clutch gear cone surface 3a and balk ring cone surface 4a by the synchronizing support force so that the number of rotations $\Delta N$ for relative rotation between synchro hub 5 and main gear 2 (and first clutch gear 3) decreases from the number of rotations $\Delta N1$ for initial relative rotation to the number of rotations $\Delta N0$ for relative rotation.

This synchronization by the support force takes place between synchro hub 5 and balk ring 4. Since the reaction force of the synchronizing support force is received by synchro hub 5, which is affixed by the transmission shaft, it is not transmitted to coupling sleeve 1. In other words, the synchronizing support force, which is mechanically generated, supports the load required for the shift operation without any increase to the shift operation load.

After this, coupling sleeve 1 moves, and from point t5, which is the intersecting point at which the decrease in the characteristics of the synchronizing support force and the increase in the characteristics of the operation load added to coupling sleeve 1 intersect, coupling sleeve chamfer 1a and balk ring chamfer 4b come into contact with one another, obstructing the movement of coupling sleeve 1. Due to the strength of this contact force, synchronizing torque is generated between clutch gear cone surface 3a and balk ring cone surface 4a and synchronization takes place in the same balk state as with conventional synchronizers.

For synchronization whereby the chamfers come into contact with one another, since it is sufficient to lower the number of rotations $\Delta N$ for relative rotation between synchro hub 5 and main gear 2 (and first clutch gear 3) from the number of rotations $\Delta N0$ for the relative rotation that was already lowered due to the mechanical synchronizing operation to 0 number of relative rotations, the peak value for the operation load at point t6 is low, so synchronization ends at point t7, where the number of relative rotations is zero.

Then, when synchronization ends, the synchronizing torque disappears, the obstructing force against coupling sleeve 1 is released, allowing for the movement of coupling sleeve 1. At point t6 on, insert keys 6 disengage from the key grooves in coupling sleeve 1 along with the movement of coupling sleeve 1 in the axial direction, and at point t7 coupling sleeve 1 pushes through balk ring 4. At point t8 coupling sleeve 1 interlocks with clutch gear chamfer 3b of clutch gear 3, and at point t9 the shift operation ends.

Therefore, as is the case with conventional synchronizers, during the synchronizing operation, the coupling sleeve and the chamfers for the balk ring come into contact. When synchronization takes place in which the number of rotations ΔN1 for the initial relative rotation is lowered to zero number of relative rotations due to only the operation load added to the coupling sleeve, the operation load increases greatly at the point that is slightly after point t4, as shown in FIG. 12 for the characteristics of the conventional operation force, and the operating force decreases from point t6, resulting in an increased peak value for the operation load.

In contrast, for the synchronizer for Working Example 1, as described above, before coupling sleeve 1 and chamfers 1a and chamfers 4b of balk ring 4 come into contact due to the synchronizing force in which the number of rotations ΔN1 for the initial relative rotation is lowered to ΔN0 number of relative rotations, contact is made between convex portion 4d and concave portion 5d formed on balk ring 4 and synchro hub 5 in order to compensate in advance for the synchronizing support force that is generated. The characteristics of the operation force that is generated this time, as shown in FIG. 12, exhibit a sharp increase and decrease in operation load characteristics in the range from t4 to t7.

Therefore, the peak value of the operation load, as indicated by the period of reduced peak values for the operation load shown in FIG. 12, can be substantially reduced compared to the conventional device. As a result, when shift operation force is delivered by an actuator, for example, a compact actuator can be used that has a rated output with the capability to obtain the peak value for a lowered operation load.

In addition, the area indicated by hatching in FIG. 12 is the period in which the volume of synchronization tasks decreases in relation to the volume of synchronization tasks for the conventional device. The portion of the volume of synchronization tasks due to synchronization support that takes place without adding operation load to coupling sleeve 1 decreases, as compared to the volume of synchronization tasks in the conventional device, thus allowing for a substantial decrease in the volume of synchronization tasks.

Next is provided an explanation of the results obtained. The results as specified below were obtained in relation to the transmission synchronizer in Working Example 1.

(1) A transmission synchronizer equipped with coupling sleeve 1, synchro hub 5, balk ring 4 and clutch gear 3 comprises a synchronizing support force generating mechanism that, during a shift when relative rotation is generated between synchro hub 5 and balk ring 4 by a minute synchronizing torque generated between balk ring cone surface 4a and clutch gear cone surface 3a, converts the circumferential force induced by the relative rotation to an axially applied synchronizing support force, with which balk ring 4 is pressed against said clutch gear 3. Since a relative rotation regulating structure located between balk ring 4 and synchro hub 5 is provided for regulating said relative rotation between balk ring 4 and synchro hub 5 when in neutral so that the synchronizing support force is not generated, the peak value of the operation load during synchronization can be effectively and reliably reduced, regardless of whether or not drag torque is generated when in neutral. As a result, when in neutral, the locking up and heating up of balk ring 4 can be reliably prevented, the reliable durability of balk ring 4 can be improved. For manual transmissions, the shift operation force applied to the shift lever by the driver can be reduced, and for automatic MT, a compact actuator can be used, which is advantageous from the standpoint of both cost and space.

(2) The synchronizing support force generating mechanism is provided in a position that faces the axial direction of synchro hub 5 and balk ring 4 and comprises synchro hub concave portion 5d and balk ring convex portion 4d, which come into contact with the cam surface by means of the indexed relative rotation between synchro hub 5 and balk ring 4 and generate a synchronizing support force. The relative rotation regulating structure is provided in a position that faces the axial direction of synchro hub 5 and balk ring 4 and comprises relative rotation positioning concave portion 8 and relative rotation positioning convex portion 7 for regulating the amount of relative rotation between synchro hub 5 and balk ring 4 by means of concave-and-convex contact. This allows for a simple configuration in which the number of parts is not increased and in which the amount of relative rotation between synchro hub 5 and balk ring 4 can be reliably regulated by means of concave-and-convex contact.

(3) Since the circumferential gap between the inclined surface of synchro hub concave portion 5d and the inclined surface of balk ring convex portion 4d is L1 and the circumferential gap between relative rotation positioning concave portion 8 and relative rotation positioning convex portion 7 is L2, and L1 is larger (or longer) than L2, the contact between the inclined surfaces of synchro hub concave portion 5d and balk ring convex portion 4d can be reliably prevented when in neutral by simply setting the circumferential dimensions.

(4) Since relative rotation positioning convex/concave portions 7 and 8 interlock when in neutral and are released when synchronization takes place, the occurrence of the spontaneous push load FN can be reliably prevented when in neutral, and when synchronization takes place, indexing of balk ring 4 and the shift operation can be ensured.

(5) Since the axial distance of relative rotation positioning convex portion 7 is L4, and the amount in which balk ring 4 moves in the axial direction in order to perform synchronization is L3, and L3 is greater than L4, the occurrence of spontaneous push load FN can be reliably prevented when in neutral by simply setting the axial dimensions, and when synchronization takes place, indexing of balk ring 4 and the shift operation can be ensured.

(6) Since relative rotation positioning concave portion 8 is a rectangular groove and relative rotation positioning convex portion 7 is a single rectangular projection, relative rotation positioning convex portion 7 and concave portion 8 for regulating the amount of relative rotation between synchro hub 5 and balk ring 4 can easily be manufactured.

For Working Example 2, the relative rotation positioning convex/concave portion is a trapezoidal structure instead of the rectangular structure used in Working Example 1.

Figure 13:
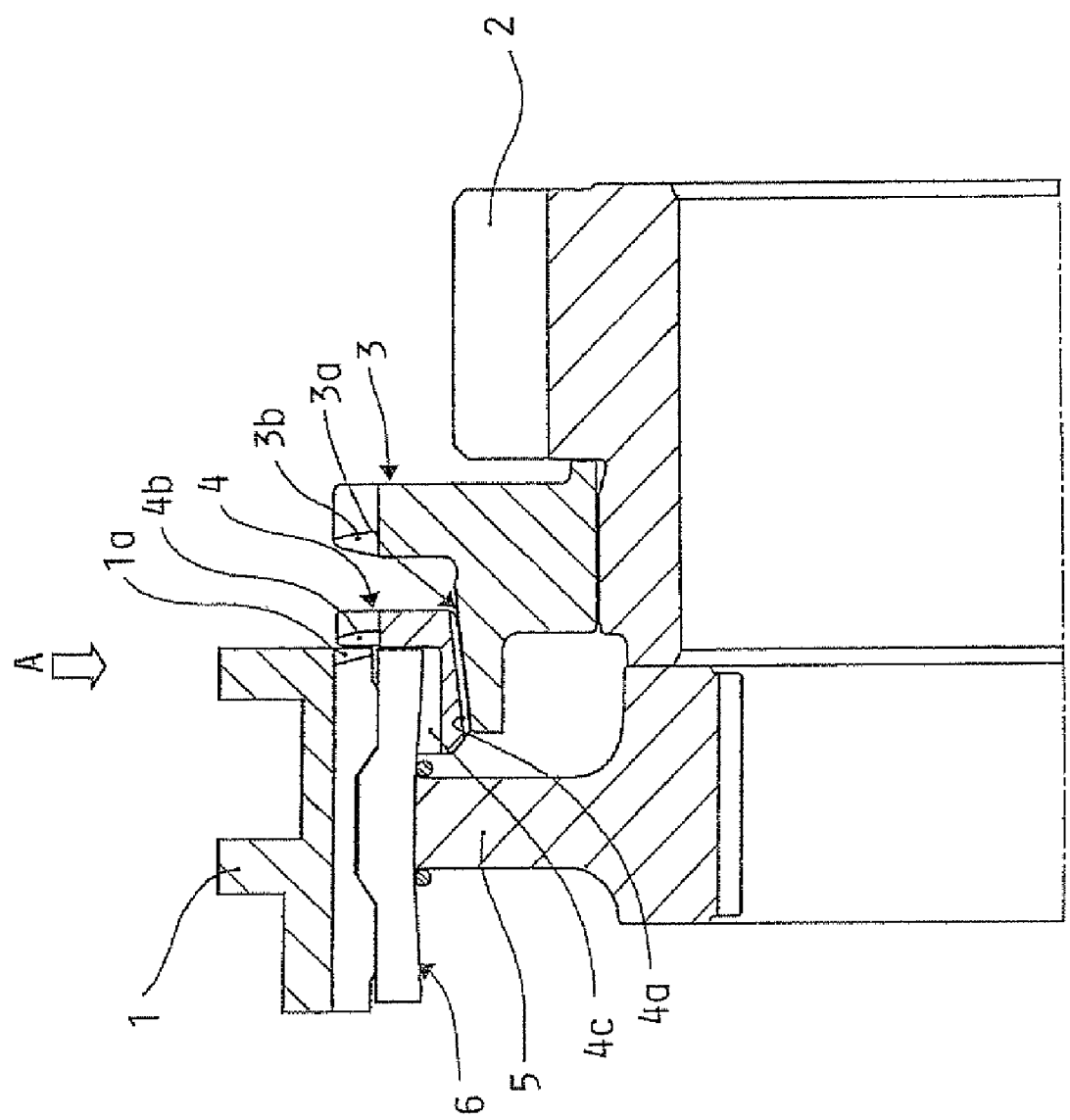
FIG. 13 is a cross-sectional view of the insert key section in the synchronizer for Working Example 2 when in neutral.
Figure 14:
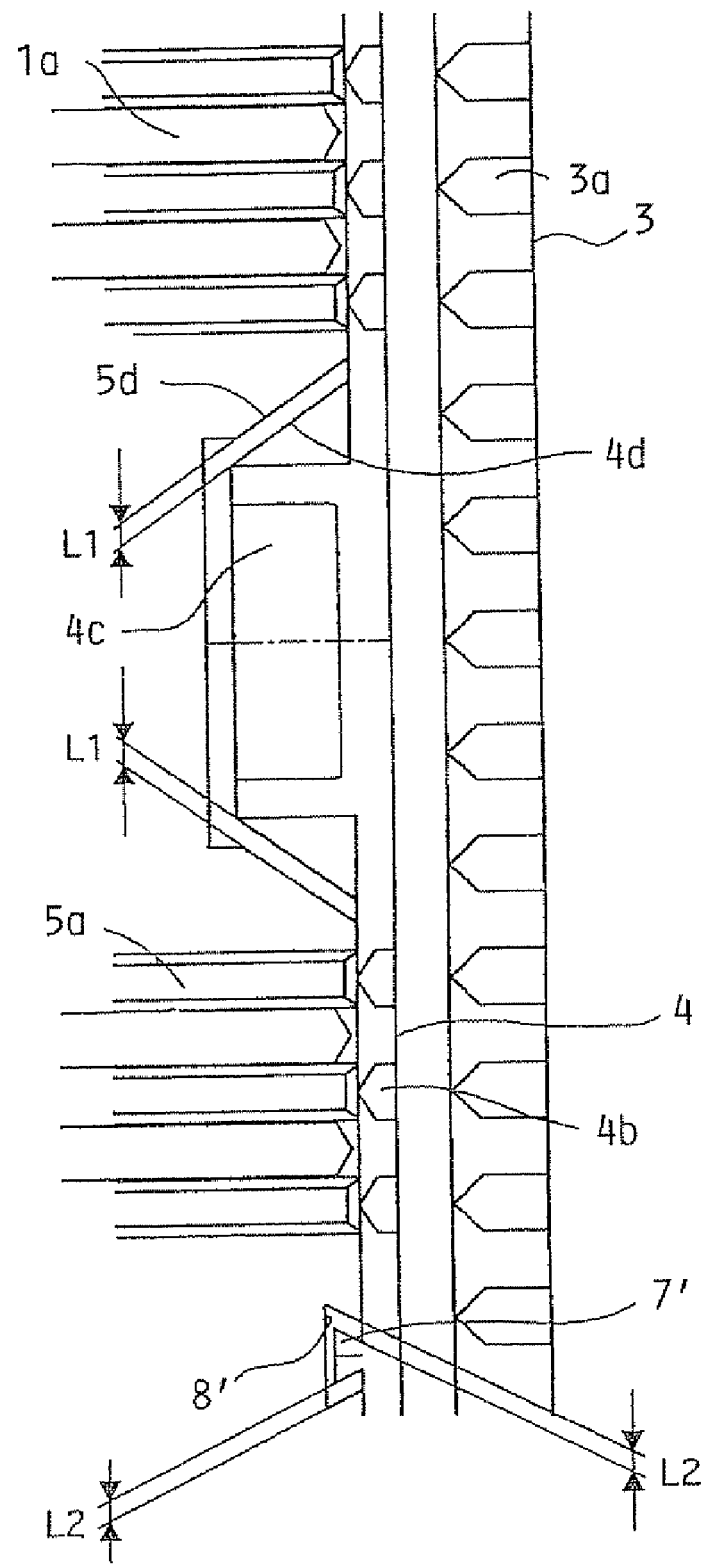
FIG. 14 is a partial plan view of the synchronizer for Working Example 2 seen from the direction of arrow A shown in FIG. 13.

FIG. 13 is a cross-sectional view of the insert key portion for the synchronizer for Working Example 2 when in neutral. FIG. 14 is a partial plan view of the synchronizer for Working Example 2 seen from the direction of arrow A in FIG. 13. The overall configuration and the configuration for the synchronizing support force generating mechanism are the same as those for Working Example 1, so an explanation for these configurations has been omitted. Below is provided an explanation of the relative rotation regulating structure that has been modified for Working Example 2.

The relative rotation regulating structure for Working Example 2 comprises relative rotation positioning concave portion 8' and relative rotation positioning convex portion 7' whereby relative rotation positioning concave portion 8' is a trapezoidal groove with a narrower circumferential length at the opening than the circumferential length at the bottom, and relative rotation positioning convex portion 7' is a trapezoidal projection with a wider circumferential length at the top than the circumferential length at the base.

Figure 20:
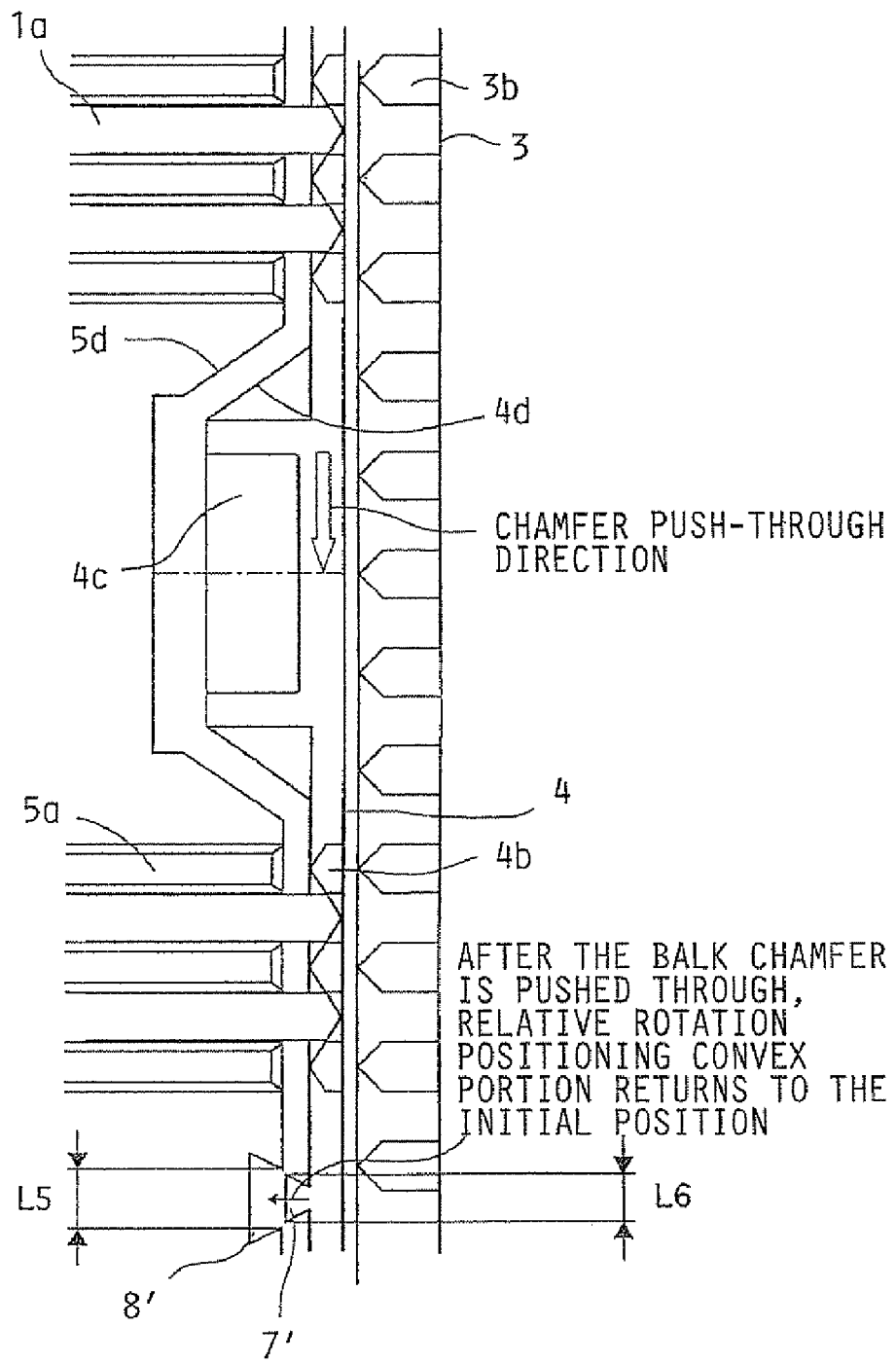
FIG. 20 is a partial plan view of the synchronizer for Working Example 2 seen from the direction of arrow A shown in FIG. 19.

If the circumferential length of the opening of relative rotation positioning concave portion 8' is L5 and the circumferential length of the top of relative rotation positioning convex portion T is L6, then L5 is set to be longer (or greater) than L6, as shown in FIG. 20.

Next is provided an explanation of the operation.

When in neutral, there is a relative rotation difference between synchro hub 5 and clutch gear 3, and balk ring 4 rotates with synchro hub 5 (refer to FIGS. 13 and 14).

When drag torque is generated between balk ring cone surface 4a and clutch gear cone surface 3a due to the weight of balk ring 4 or oil film, etc., relative rotation is induced between balk ring 4 and synchro hub 5 because of this drag torque, and synchro hub concave portion 5d and the balk ring convex portion 4d move in the circumferential direction in an attempt to make contact.

However, before the inclined surface of balk ring convex portion 4d and the inclined surface of synchro hub concave portion 5d abut, the circumferential gap L2 between relative rotation positioning convex portion 7' and relative rotation positioning concave portion 8' disappears, and L2 becomes L2'=0 (see FIG. 16), so relative rotation positioning convex portion 7' and concave portion 8' lock with one another. The circumferential gap between balk ring convex portion 4d and synchro hub concave portion 5d, or L1, is maintained as a gap in which L1'>0. In other words, when in neutral, the occurrence of spontaneous push load FN due to the contact between bulk ring convex portion 4d and synchro hub concave portion 5d can be prevented (compare FIGS. 6A and 6B to FIGS. 15 and 16).

In addition, the reverse slope from relative rotation positioning convex/concave portions 7' and 8' also operates when in neutral, so that when drag torque is generated between balk ring cone surface 4a and clutch gear cone surface 3a due to the weight of balk ring 4 or oil film, etc., and when the circumferential length of relative rotation positioning convex/concave portions 7' and 8' becomes zero, draw force fN (see FIG. 16) is generated when balk ring 4 is returned in the direction of synchro hub 5 due to the reverse slope of the inclined surfaces. In other words, even if there is input such as vibration in the direction in which balk ring 4 and synchro hub 5 get separated, contact between balk ring convex portion 4d and synchro hub concave portion 5d can be reliably prevented.

Figure 15:
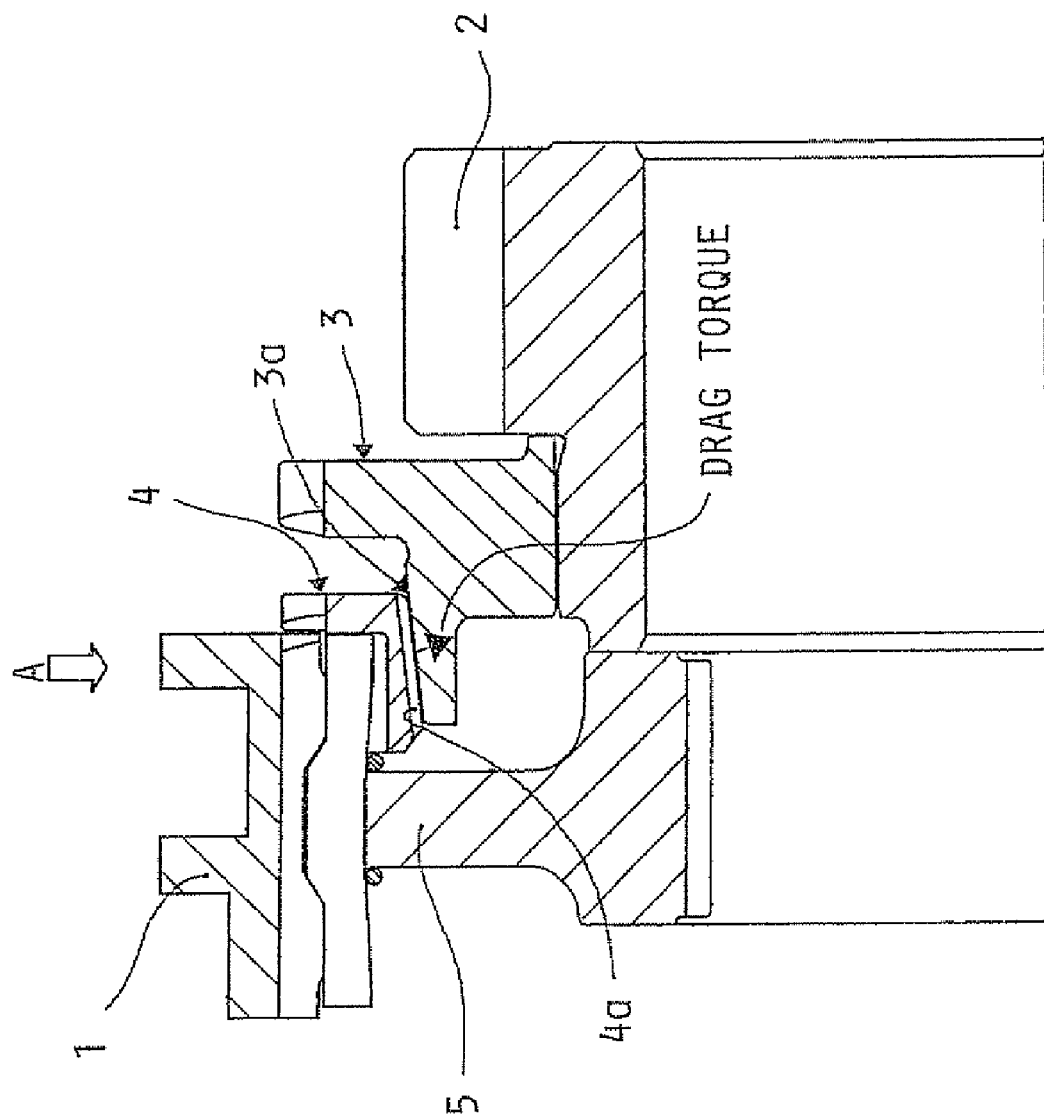
FIG. 15 is a cross-sectional view of the insert key section when the relative rotation positioning portion is in the locked state for the synchronizer in Working Example 2.
Figure 16:
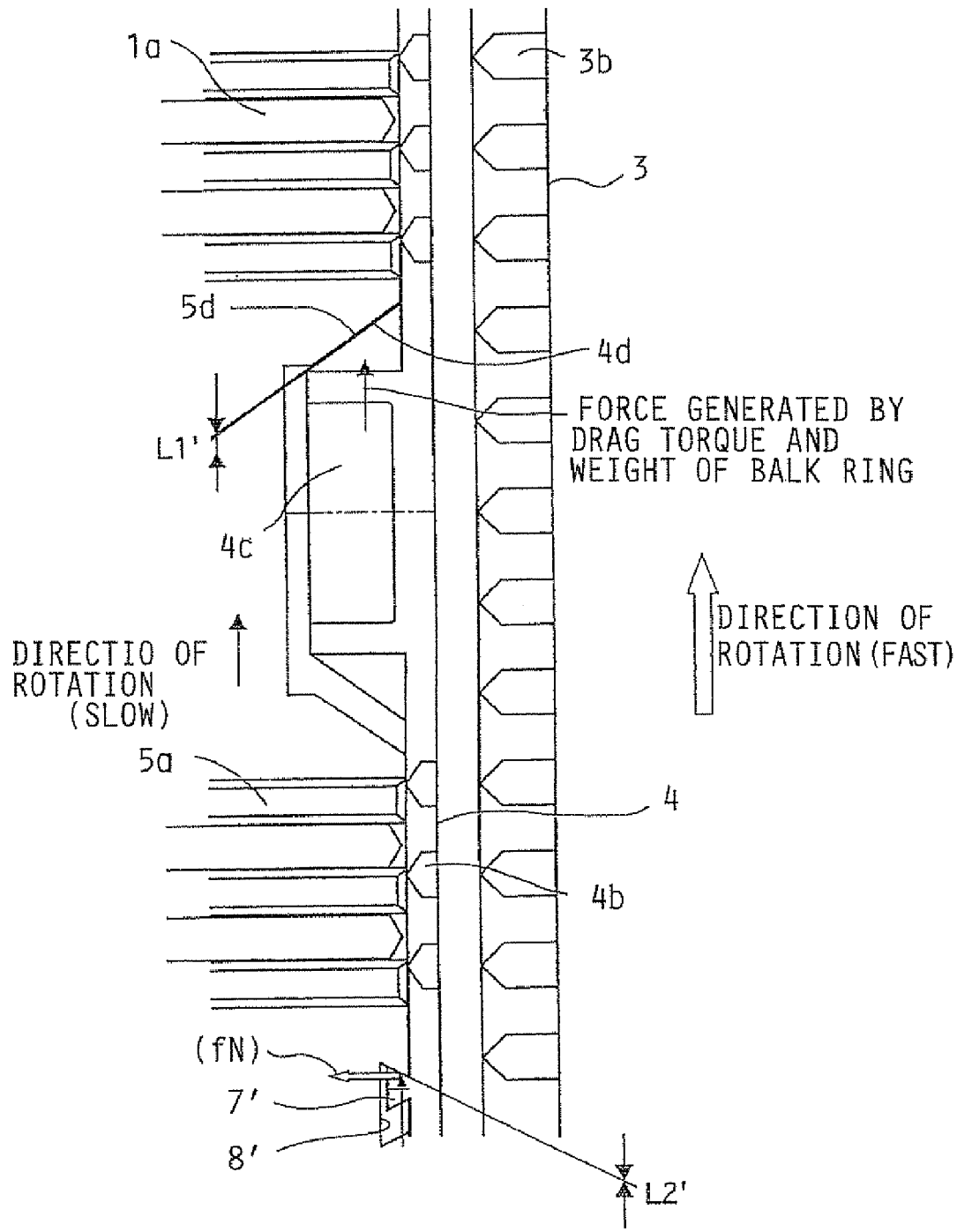
FIG. 16 is a partial plan view of the synchronizer for Working Example 2 seen from the direction of arrow A shown in FIG. 15.
Figure 17:
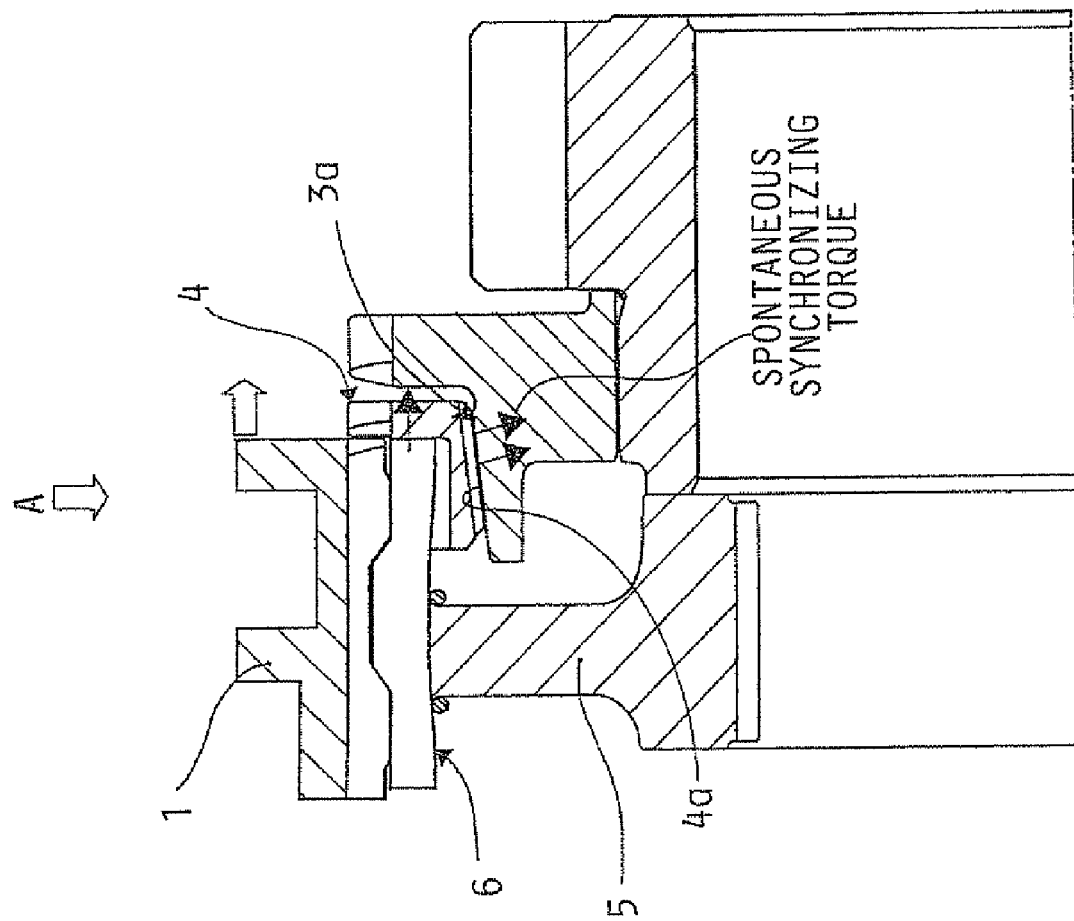
FIG. 17 is a cross-sectional view of the insert key section in the synchronizer for Working Example 2 during synchronization.
Figure 18:
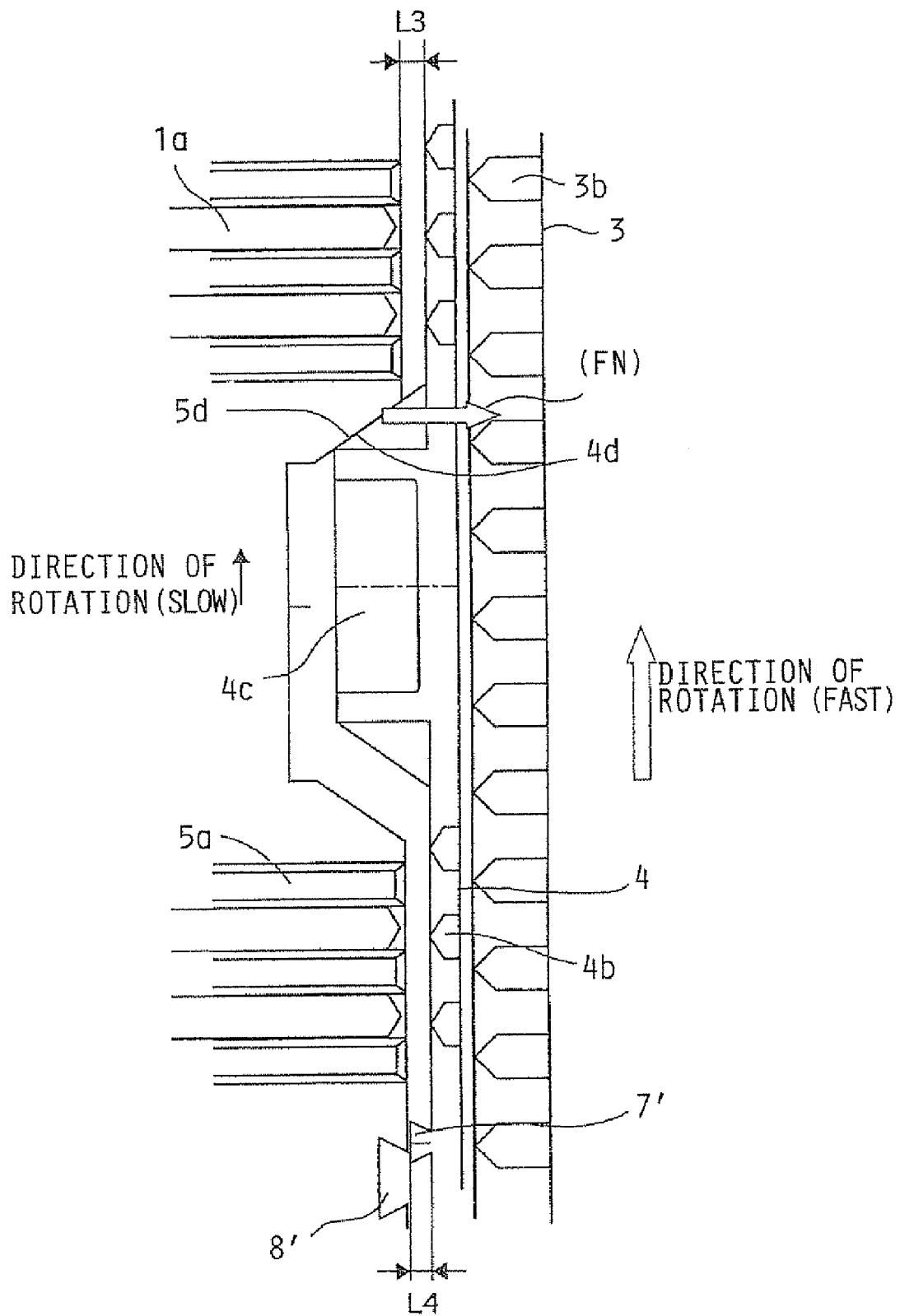
FIG. 18 is a partial plan view of the synchronizer for Working Example 2 seen from the direction of arrow A shown in FIG. 17.

Therefore, as shown in FIGS. 15 and 16, when coupling sleeve 1 is moved from the neutral position to the shift direction, insert keys 6 push balk ring 4. Balk ring cone surface 4a and clutch gear cone surface 3a come into contact with one another, but since the axial distance of relative rotation positioning convex portion 7', or L4, is shorter or smaller than the distance of the movement of balk ring 4, or L3, the fitting of relative rotation positioning convex portion 7' and concave portion 8' is released so the synchronizing operation becomes possible (refer to FIGS. 17 and 18).

When insert keys 6 push balk ring 4 such that balk ring cone surface 4a and clutch gear cone surface 3a come into contact with one another, a minute synchronizing torque is generated, and indexing of balk ring 4 is performed. The indexing is performed (by sliding) along the inclined surfaces of the cam of balk ring convex portion 4d and synchro hub concave portion 5d. Therefore, a spontaneous synchronizing force is generated by balk ring convex portion 4d and synchro hub concave portion 5d at the time that the indexing is performed. Balk ring 4 does not use the input from coupling sleeve 1, so the synchronizing operation begins spontaneously.

Figure 19:
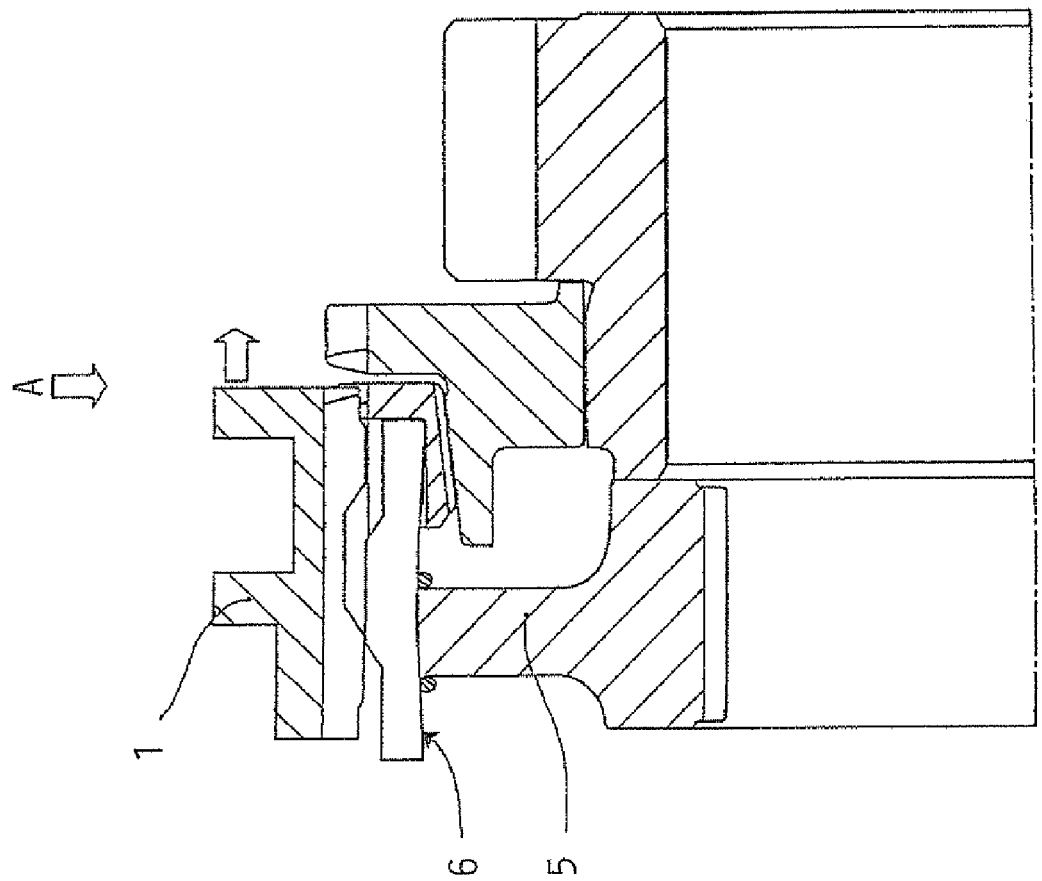
FIG. 19 is a cross-sectional view of the insert key section in the synchronizer for Working Example 2 during the balk ring chamfer pushing-through state.

After indexing of balk ring 4 is completed, coupling sleeve 1 moves even further. Coupling chamfer 1a pushes balk ring chamfer 4b, and spontaneous synchronizing torque and synchronizing torque generated by the pushing force of coupling chamfer 1a on balk ring chamfer 4b cause the synchronizing operation to take place. When synchronization is completed, coupling chamfer 1a pushes through balk ring chamfer 4b (refer to FIGS. 19 and 20).

When coupling chamfer 1a pushes through balk ring chamfer 4b and strokes it, and when coupling chamfer 1a moves as far as the position between itself and where it comes into contact with balk ring chamfer 4b, coupling chamfer 1a finishes pushing through balk ring chamfer 4b.

Next, coupling chamfer 1a strokes and interlocks with clutch gear chamfer 3b so that synchro hub 5 and clutch gear 3 are integrated by means of a spline connection via coupling sleeve 1 and shifting is completed.

At the "shifting completed" state, at the point at which the synchronization that took place before shifting was completed is finished, balk ring 4 returns to the neutral position (initial position) due to the force of a return spring (not shown in the Figure). Relative rotation positioning convex portion 7 and concave portion 8 also return to the initial position in accordance with the return of balk ring 4 to its initial position. In other words, after balk ring chamfer 4b is pushed through, since the circumferential length L5 of the opening of relative rotation positioning concave portion 8' is greater than the circumferential length of the top of relative rotation positioning convex portion 7', relative rotation positioning convex portion 7' enters relative rotation positioning concave portion 8' due to the force of the return spring. The rest of the operations are the same as for Working Example 1, so an explanation has been omitted.

Next is provided an explanation of the results obtained. The results as specified below, in addition to the results described in (1) to (5) of Working Example 1 were obtained in relation to the transmission synchronizer in Working Example 2.

(7) Since relative rotation positioning concave portion 8' is a trapezoidal groove with a narrower circumferential length at the opening than the circumferential length at the bottom, and relative rotation positioning convex portion 7' is a trapezoidal projection with a wider circumferential length at the top than the circumferential length at the base, draw force fN is generated when balk ring 4 is returned in the direction of synchro hub 5 due to the reverse slope of the inclined surfaces of relative rotation positioning convex/concave portions 7' and 8'. So, even if there is input such as vibration, for example, in the direction in which balk ring 4 and synchro hub 5 get separated, contact between balk ring convex portion 4d and synchro hub concave portion 5d can be reliably prevented.

(8) Since the circumferential length of the opening of relative rotation positioning concave portion 8' is L5, and the circumferential length of the top of relative rotation positioning convex portion 7' is L6, and L5 is greater (longer) than L6, as shown in FIG. 20, once the interlocking of relative rotation positioning convex/concave portions 7' and 8' that takes place when the shift is made from neutral to synchronization is released, relative rotation positioning convex/concave portions 7' and 8' can be reliably returned to their initial interlocked state in accordance with the return of balk ring 4 to its initial position.

Working Example 3 is an example in which the relative rotation regulating structure consists of a rectangular groove and two rectangular projections.

Figure 21:
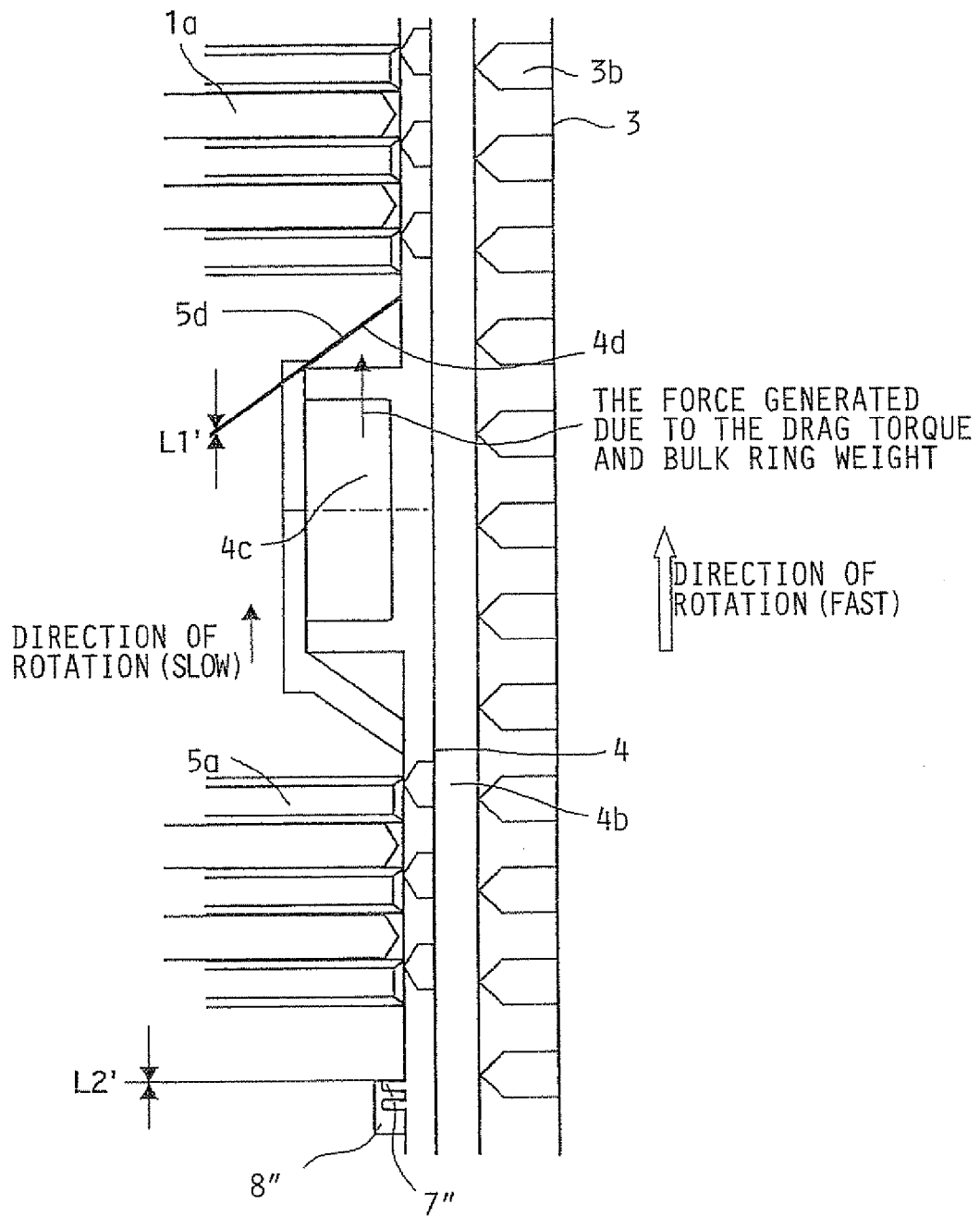
FIG. 21 is a plan view of the insert key section when the relative rotation positioning portion is in the locked state for the synchronizer in Working Example 3.

In other words, as shown in FIG. 21, the relative rotation regulating structure for Working Example 3 is provided in a position that faces the axial direction of synchro hub 5 and balk ring 4 and consists of relative rotation positioning concave portion 8" and relative rotation positioning convex portion 7" that regulate the amount of relative rotation between synchro hub 5 and balk ring 4 by means of concave-convex contact. In addition, relative rotation positioning concave portion 8" is a rectangular groove and relative rotation positioning convex portion 7" consists of two rectangular projections arranged in parallel.

The rest of the configuration is the same as that for Working Example 1, so an explanation has been omitted. Also, the operation is the same as that for Working Example 1, so an explanation of this has been omitted as well.

Next, an explanation is provided of the results obtained. The results as specified below, in addition to the results shown in (1) to (5) of Working Example 1 were obtained in relation to the transmission synchronizer in Working Example 3.

(9) Since relative rotation positioning concave portion 8" is a rectangular groove and relative rotation positioning convex portion 7" consists of two rectangular projections, the overall width of both relative rotation positioning concave portion 8" and relative rotation positioning convex portion 7" becomes larger, making it easier to control dimensions and allowing for more precise setting of the circumferential gap between relative rotation positioning convex/concave portions 7" and 8".

Working Example 4 is an example of an application of an automatic MT for the synchronizer in any of Working Examples 1, 2 or 3.

Figure 22:
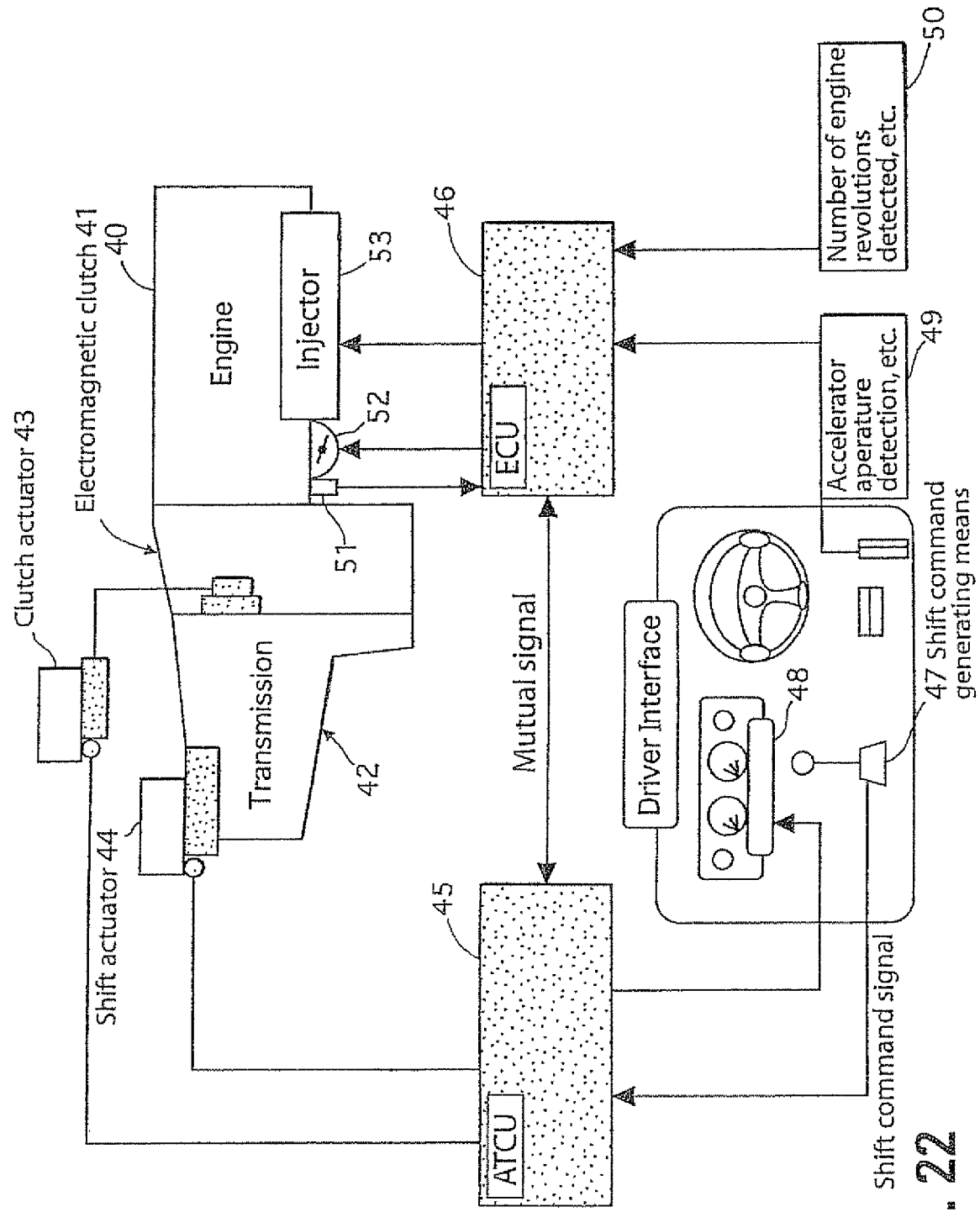
FIG. 22 is an overall system diagram of the automatic MT described in Working Example 4, which employs the synchronizer pertaining to the present invention.

In other words, as shown in FIG. 22, the synchronizer for Working Example 4 is equipped with engine 40, electromagnetic clutch 41, automatic MT 42, clutch actuator 43, shift actuator 44, automatic MT control unit 45 and engine control unit 46. The automatic MT 42 has an input shaft connected to an engine via a clutch and changes the rotational speed of the input shaft to transmit to an output shaft. The clutch is automatically operated by an actuator that is controlled with signals from the control unit 45.

Automatic MT control unit 45 inputs a shift command from shift command generating means 47, such as a shift lever, and outputs control commands to clutch actuator 43 and shift actuator 44 based on the shift command. In addition, the shift position is indicated on a shift position indicator provided in a position that can be visually confirmed by the driver.

Engine control unit 46 inputs sensor signals from accelerator aperture sensor 49, engine speed sensor 50 and vehicle speed sensor 51 and outputs control commands to electronically controlled throttle valve 52 and fuel injector 53. Automatic MT control unit 45 and engine control unit 46 are connected via a two-way communication line so that when shifting, for example, a command to lower the engine torque can be output from automatic control unit 45 to engine control unit 46 in order to effectively prevent a shudder when changing gears.

Figure 23:
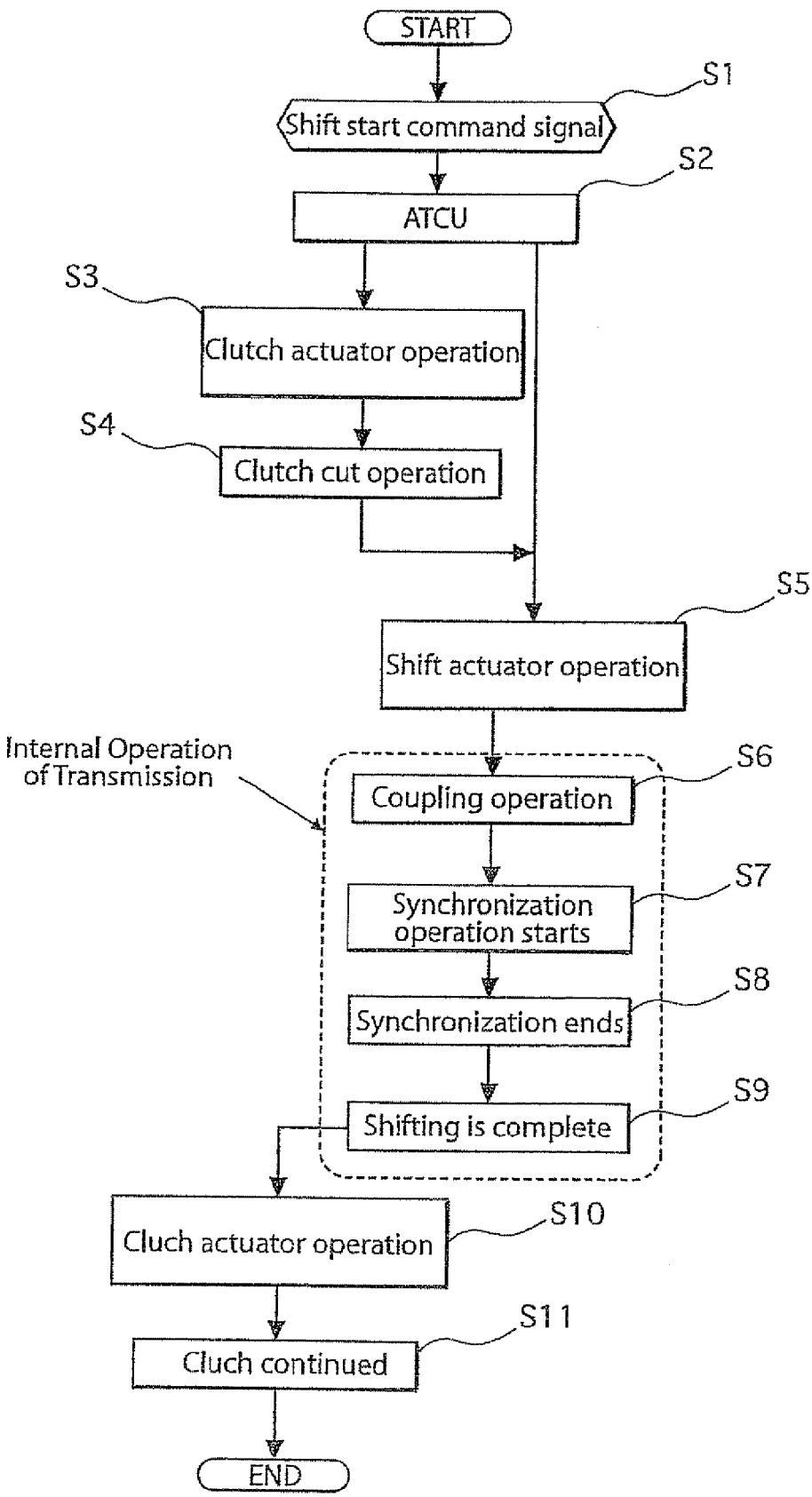
FIG. 23 is a flow chart showing the shift operation flow for the automatic MT described in Working Example 4.

Next is provided an explanation of the operation. As shown in FIG. 23, when a start-shifting-command is output from shift command generating means 47 (Step 1), for automatic MT control unit 45 (Step S2), the operation command to clutch actuator 43 (Step S3), the clutch cut operation (Step S4) and the operation command to shift actuator 43 (Step S5), or only the operation command to shift actuator 43 (Step S5) are output.

Based on the operation command(s) to said shift actuator 43, the internal operation of automatic MT 42 is executed in the order of the operation of coupling sleeve 1 (Step S6), the synchronization operation starts (Step S7) and synchronization ends (Step S8), and the shift is completed (Step S9).

When the shift process is completed within automatic MT 42, the process proceeds to outputting the operation command to clutch actuator 43 (Step S10) and the clutch connecting operation (Step S11) and the shift operation ends.

When shifting, the shift operating force for shift actuator 44 is reduced by a synchronizing support force so a compact actuator can be used, which is advantageous from the standpoint of cost and space.

An explanation has been provided of Working Examples 1-4 for the transmission synchronizer pertaining to the present invention. However, in terms of the specific configuration, the present invention is not limited to these working examples and additions or changes may be made to the design as long as they do not deviate from the subject matter of the invention pertaining to the claims of the present patent application.

For example, the synchronizing support force generating mechanism provided between the synchro hub and balk ring in Working Examples 1-3 is not limited to a key-type synchronizing device and could be a pin-type synchronizing device or another type of synchronizing device that has a synchro hub and balk ring that rotate relative to one another during the initial stage of synchronization.

In Working Examples 1-3, a synchronizing support force generating mechanism that has cam surface contact using inclined surfaces was used, but as long as the mechanism converts the circumferential force induced by the relative rotation that is generated between the synchro hub and balk ring to an axially applied synchronizing support force, the specific mechanism is not limited to the mechanisms described in Working Examples 1-3. The various mechanisms described in Japanese Patent No. 2004-135994, for example, could be used.

In Working Examples 1-3, a rectangular or trapezoidal groove and projections were used for the structure for the relative rotation regulating structure, but as a structure is provided between the balk ring and synchro hub that in neutral regulates the amount of relative rotation between the balk ring and the synchro hub so that a synchronizing support force is not generated, it is not limited to the structures described in Working Examples 1-3.

The synchronizer pertaining to the present invention can be applied to a manual transmission in which the shifting operation is performed manually by the driver using a shift lever, or to what is referred to as an automatic MT, which has a control-type clutch located between the engine and the transmission whereby the shifting operation is performed by a motor actuator while the control-type clutch is disengaged when changing gears.

Although specific embodiments have been illustrated and described herein, it will be appreciated by those of ordinary skill in the ail that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A transmission synchronizer, comprising
a coupling sleeve;
a synchro hub;
a balk ring including a balk ring cone surface;
a clutch gear including a clutch gear cone surface;
a relative rotation regulating structure located between the balk ring and the synchro hub; and
a synchronizing support force generating mechanism located between the balk ring and the synchro hub and spaced apart in a circumferential direction from the relative rotation regulating structure;

wherein a relative rotation is generated between the synchro hub and the balk ring during a shift by a minute synchronizing torque generated between the balk ring cone surface and the clutch gear cone surface, the relative rotation inducing a circumferential force;

wherein the synchronizing support force generating mechanism is adapted to convert the circumferential force to a synchronizing support force, the synchronizing support force axially-applied to press the balk ring against the clutch gear;

wherein the relative rotation regulating structure is adapted to regulate the relative rotation between the balk ring and the synchro hub to prevent generation of the synchronizing support force by the synchronizing support force generating mechanism while in neutral.

2. The transmission synchronizer of claim 1, wherein
the synchronizing support force generating mechanism includes a synchro hub concave portion of the synchro hub and a balk ring convex portion of the balk ring, the synchro hub concave portion and the balk ring convex portion extending axially and the synchronizing support force generating mechanism generating the synchronizing support force by coming into contact with a cam surface due to the relative rotation between the synchro hub and the balk ring; and wherein
the relative rotation regulating structure includes a relative rotation positioning concave portion and a relative rotation positioning convex portion extending axially that regulate the amount of relative rotation between the synchro hub and the balk ring by means of concave-convex contact of the relative rotation positioning concave portion and the relative rotation positioning convex portion.

3. The transmission synchronizer of claim 2, wherein a circumferential gap between an inclined surface of the synchro hub concave portion and an inclined surface of the balk ring convex portion is L1, a circumferential gap between the relative rotation positioning concave portion and the relative rotation positioning convex portion is L2, and L1 is larger than L2.

4. The transmission synchronizer of claim 2, wherein the relative rotation positioning concave portion is adapted to engage with the relative rotation positioning convex portion when in neutral, and to release engagement during the synchronizing operation.

5. The transmission synchronizer of claim 4, wherein an axial length of the relative rotation positioning convex portion is L4, an axial moving distance of the balk ring during synchronization is L3, and L3 is larger than L4.

6. The transmission synchronizer of claim 2, wherein the relative rotation positioning concave portion comprises one or more rectangular grooves, and the relative rotation positioning convex portion comprises one or more rectangular projections.

7. The transmission synchronizer of claim 2, wherein the relative rotation positioning concave portion is a trapezoidal groove with a circumferential length at its opening narrower than a circumferential length at its bottom, and the relative rotation positioning convex portion is a trapezoidal projection with a circumferential length at its top wider than a circumferential length at its base.

8. The transmission synchronizer of claim 7, wherein the circumferential length of the relative rotation positioning concave portion at its opening is L5, the circumferential length of the relative rotation positioning convex portion at its top is L6, and L5 is larger than L6.

9. The transmission synchronizer of claim 2, wherein the relative rotation positioning concave portion is one of a plurality of concave circumferentially-spaced portions, each of the plurality comprising a rectangular groove, and the relative rotation positioning convex portion is one of a plurality of convex circumferentially-spaced portions, each of the plurality comprising two rectangular projections.

10. A method of operating a transmission synchronizer, comprising:
generating a relative rotation between a synchro hub and a balk ring during a shift by a minute synchronizing torque generated between a balk ring cone surface and a cone surface of a clutch gear, the relative rotation inducing a circumferential force;
converting the circumferential force to a synchronizing support force using a synchronizing support force generating mechanism located between the balk ring and the synchro hub, the synchronizing support force axially applied to press the balk ring against the clutch gear; and
regulating the relative rotation between the balk ring and the synchro hub so that the synchronizing support force is not generated in a neutral position using a relative rotation regulating structure located between the balk ring and the synchro hub and spaced apart in a circumferential direction from the synchronizing support force generating mechanism.

11. The method of claim 10, wherein the relative rotation regulating structure is formed of facing portions of the balk ring and the synchro hub.

12. The method of claim 11, wherein the synchronizing support force generating mechanism is formed of facing portions of the synchro hub and the balk ring and comprises a synchro hub concave portion and a balk ring convex portion where the synchronizing support force is generated by the balk ring convex portion coming into contact with a cam surface due to the relative rotation between the synchro hub and the balk ring; and wherein
the relative rotation regulating structure comprises a relative rotation positioning concave portion and a relative rotation positioning convex portion that regulates the amount of relative rotation between the synchro hub and the balk ring by means of concave-convex contact.

13. A transmission with a synchronizer, the synchronizer generating a synchronizing torque when changing speeds between an engine connected to the transmission via a clutch and an output of the transmission, the transmission comprising:
a synchro hub;
a coupling sleeve connected to the synchro hub and axially-movable toward the clutch to change between a neutral position and a shift change position;
a main gear engaged to rotate with the output of the transmission;
a clutch gear integrated with the main gear and including a gear cone surface; and
a balk ring positioned between the coupling sleeve and the clutch gear to be axially-movable and including a balk ring cone surface taper-fitted into the gear cone surface;
wherein the synchro hub and the balk ring form a synchronizing support force generating mechanism on facing surfaces therebetween to convert a circumferential force to an axially applied synchronizing support force, and
wherein the synchro hub and the balk ring form a relative rotation regulating structure on the facing surfaces therebetween to regulate the relative rotation between the synchro hub and the balk ring while in the neutral position, the synchronizing support force generating mechanism and the relative rotation regulating structure spaced apart in a circumferential direction from one another.

14. The transmission of claim 13, wherein the balk ring is adapted to be pressed against the clutch gear with one of a motor actuator or a shift lever.

15. A transmission with a synchronizer, the synchronizer generating a synchronizing torque when changing speeds between an engine connected to the transmission via a clutch and an output of the transmission, the transmission comprising:
- a synchro hub;
- a coupling sleeve connected to the synchro hub, the coupling sleeve being axially-movable toward the clutch to change between a neutral position and a shift change position;
- a main gear engaged to rotate with the output of the transmission;
- a clutch gear integrated with main gear, the clutch gear forming a gear cone surface; and
- a balk ring positioned between the coupling sleeve and the clutch gear to be axially-movable and including a balk ring cone surface taper-fitted into the gear cone surface;
- means for converting a circumferential force to an axially applied synchronizing support force, the converting means being integral portions of facing surfaces of the synchro hub and the balk ring; and
- means for regulating a relative rotation between the synchro hub and the balk ring while in the neutral position, the regulating means being integral portions of the facing surfaces of the synchro hub and the balk ring and being spaced apart in a circumferential direction from the converting means.

16. The transmission of claim 15, wherein the circumferential force is induced by the relative rotation, where the relative rotation is generated between the synchro hub and the balk ring during a shift.

17. The transmission of claim 15, wherein the balk ring is adapted to be pressed against the clutch gear with one of a motor actuator or a shift lever.

* * * * *